(12) United States Patent
Kubat

(10) Patent No.: US 12,247,635 B2
(45) Date of Patent: Mar. 11, 2025

(54) DUAL RATE TORSIONAL COUPLING

(71) Applicant: LORD Corporation, Cary, NC (US)

(72) Inventor: Timothy Kubat, Fairview, PA (US)

(73) Assignee: LORD Corporation, Cary, NC (US)

( * ) Notice: Subject to any disclaimer, the term of this patent is extended or adjusted under 35 U.S.C. 154(b) by 664 days.

(21) Appl. No.: 17/615,195

(22) PCT Filed: Jun. 26, 2020

(86) PCT No.: PCT/US2020/039810
§ 371 (c)(1),
(2) Date: Nov. 30, 2021

(87) PCT Pub. No.: WO2020/264287
PCT Pub. Date: Dec. 30, 2020

(65) Prior Publication Data
US 2022/0228642 A1  Jul. 21, 2022

Related U.S. Application Data

(60) Provisional application No. 62/866,813, filed on Jun. 26, 2019.

(51) Int. Cl.
*F16F 15/123* (2006.01)
*F16F 15/127* (2006.01)

(52) U.S. Cl.
CPC ...... *F16F 15/12386* (2013.01); *F16F 15/127* (2013.01); *F16F 15/12346* (2013.01)

(58) Field of Classification Search
CPC ........... F16F 15/12346; F16F 15/12353; F16F 15/1236; F16F 15/12366; F16F 15/12373;
(Continued)

(56) References Cited

U.S. PATENT DOCUMENTS 4,446,955 A * 5/1984 Lech, Jr. ........... F16F 15/12353
464/68.41
6,029,793 A   2/2000 Tanaka et al.
(Continued)

FOREIGN PATENT DOCUMENTS

DE   10 2016 223635 A1    6/2017
DE      102018124196 A1 *  5/2019 ........ F16F 15/12346
(Continued)

OTHER PUBLICATIONS

Korean Office Action for Application No. 1020227002296 dated Oct. 23, 2023.
(Continued)

*Primary Examiner* — Josh Skroupa
(74) *Attorney, Agent, or Firm* — KDW FIRM PLLC

(57) ABSTRACT

Torque is applied to an inner member of a torsional coupling. The first stage (low torque) has a bonded part in series with a set of compression style coil springs. The torsional stiffness of the bonded part is approximately 25% of the resulting torsional stiffness provided by the coil springs. In the second stage (high torque), tangs on the inner member engage with a sprocket plate, transferring torque to the coil springs. The coil springs are held in place by a unique geometry on the sprocket plate and spring holders, which prevent metal-to-metal contact between the coil springs and upper and lower housing portions of the torsional coupling. Surface effect damping occurs at very high torques when the rubber molded around the tangs on the inner member rub on bumps formed on the lower housing portion. A thrust bearing reacts axial forces and eliminates metal-to-metal contact.

20 Claims, 12 Drawing Sheets

(58) Field of Classification Search
CPC ............. F16F 15/1238; F16F 15/12386; F16F 15/127; F16F 15/13461; F16F 15/13469; F16F 15/13476; F16F 15/13484; F16F 15/13492
USPC ...... 464/68.4, 68.41, 68.5, 68.6, 68.9, 68.92
See application file for complete search history.

(56) References Cited

U.S. PATENT DOCUMENTS

| | | | |
|---|---|---|---|
| 9,297,428 B2 * | 3/2016 | Gerdeman | ........ F16F 15/12366 |
| 10,203,019 B2 * | 2/2019 | Nasu | ................. F16F 15/12353 |
| 2020/0228037 A1 | 7/2020 | Black et al. | |
| 2022/0186785 A1 * | 6/2022 | Tomita | .............. F16F 15/12353 |

FOREIGN PATENT DOCUMENTS

| | | | | |
|---|---|---|---|---|
| EP | 1626196 A1 * | 2/2006 | ........ F16F 15/12366 |
| FR | 2787539 A1 * | 6/2000 | .......... F16F 15/1238 |
| JP | S 58 631 A | 1/1983 | |
| JP | S 61 4025 U | 1/1986 | |
| JP | H09053655 A | 2/1997 | |
| WO | WO-2008019641 A1 * | 2/2008 | ........ F16F 15/12346 |
| WO | WO-2018109980 A1 * | 6/2018 | ............ F16F 15/127 |
| WO | WO 2020/264287 A1 | 12/2020 | |

OTHER PUBLICATIONS

Chinese Office Action for Application No. 202080046214 dated Nov. 24, 2023.
International Search Report and Written Opinion for Application No. PCT/US2020/039810 dated Sep. 14, 2020.
European Office Action for Application No. 207434267 dated Feb. 2, 2024.

* cited by examiner

DUAL RATE TORSIONAL COUPLING

CROSS-REFERENCE TO RELATED APPLICATIONS

This application claims priority to U.S. Provisional Patent Application Ser. No. 62/866,813, which was filed on Jun. 26, 2019, the disclosure of which is incorporated by reference herein in its entirety.

FIELD OF INVENTION

The subject matter disclosed herein relates to the design, assembly and operation of a dual rate torsional coupling.

BACKGROUND

Torsional couplers are used in machinery to functionally connect an input (e.g., an engine) with an output (e.g., a transmission). At present, there is a need for a torsional coupling having variable stiffness, which can be advantageous to provide a "soft" stiffness when a first stage is engaged and a "hard" stiffness when a second stage is engaged.

SUMMARY

The torsional coupling comprises many parts that all work together. Torque is applied to the inner member. The first stage (low torque) consists of a bonded part (rubber, inner and outer member) that is in series with a set of compression style coil springs. The torsional stiffness of the bonded part is approximately 25% of the resulting torsion stiffness provided by the coil springs. The second stage (high torque) the tangs on the inner member engage with a sprocket plate which locks out the first stage and transfers all torque through the coil springs. The coil springs are held in place by a unique geometry on the sprocket plate and the spring holders. The spring holders also prevent metal to metal contact between the coil springs and the housing portions. Surface effect damping occurs at very high torques when the rubber molded around the tangs on the inner member rub on the bumps on the lower housing portion. A thrust bearing is used to react axial forces and to eliminate any metal to metal contact.

In one aspect, a dual rate coupling is disclosed. The dual rate coupling comprises: an upper housing portion having an opening positioned about a center of the upper housing portion, a plurality of coil spring receivers, and a plurality of securing points positioned about an outer circumference of the upper housing portion; a lower housing portion having an opening positioned about a center of the lower housing portion, a plurality of coil spring receivers, and a plurality of securing points positioned about an outer circumference of the lower housing portion, wherein the lower housing portion mirrors the upper housing portion for the plurality of coil spring receivers and the plurality of securing points, wherein the opening of the lower housing portion is smaller in diameter than the opening of the upper housing portion and further comprises a circular wall defining the inner diameter of the dual rate coupling, the circular wall having a plurality of bumps oriented away from the center of the lower housing portion; an inner member having a circular opening in a center of the inner member, a mounting ring, a bonding element, a plurality of bolt holes, a plurality of tangs, an outer wall, and a lower edge, wherein the plurality of tangs protrude downwardly and circumferentially from the lower edge, wherein the circular opening is adjacent to the circular wall and bumps of lower housing portion; a thrust bearing positioned around the inner member opening; a sprocket plate having a plurality of bolt holes positioned to mirror the plurality of bolt holes of the inner member, a plurality of engagement recesses and a plurality of sprocket teeth interiorly positioned about an inner opening, and a plurality of coil spring recesses exteriorly positioned about an outer surface 56; an outer coil spring; an inner coil spring having a first end and a second end; at least two coil spring holders, each having an inner ring, the inner ring of one coil spring holder capable of being inserted within the first end of the inner coil spring and the other coil spring holder capable of being inserted within the second end of the inner coil spring, wherein the combination of the two coil spring holders and the inner and outer coil springs form a coil spring assembly, wherein the coil spring assembly is capable of being inserted into the coil spring recesses of the sprocket plate, wherein the combination of the coil spring assembly and the sprocket plate form a sprocket assembly; a tubeform assembly, the tube form assembly including the inner member, an outer member and a tubeform, wherein the outer member has a circular opening positioned about a center of the outer member, a flange and a bonding ring, wherein the flange is substantially perpendicular to the bonding ring, wherein the tubeform is disposed and bonded between the inner member and the outer member, wherein the tubeform is further bonded to and round each of the plurality of tangs thereby forming a plurality of protrusions, wherein the outer member is swaged into the tubeform after being bonded; wherein each engagement recess of the sprocket plate is capable of receiving a corresponding single protrusion between a pair of sprocket teeth and maintaining a gap between the corresponding single protrusion and at least one of the sprocket teeth; wherein the lower housing portion and the thrust bearing have the sprocket assembly positioned on top of the thrust bearing with a portion of each of the plurality of coil spring assemblies positioned in one of the coil spring receivers of the lower housing portion; wherein the tubeform assembly is secured to and on top of the sprocket assembly; wherein the upper housing portion is positioned on top of the sprocket assembly and disposed about the tubeform assembly, wherein a portion of each of the plurality of coil spring assemblies positioned in one of the coil spring receivers of upper housing portion; and wherein the upper housing portion and the lower housing portion are secured together.

In another aspect, a dual rate coupling is disclosed, the coupling comprising: a housing comprising: an upper housing portion having a main body, an opening formed in the main body of the upper housing portion, and a plurality of coil spring receivers arranged or positioned circumferentially about and extending away from the main body of the upper housing portion; a lower housing portion having a main body, an opening formed in the main body of the lower housing portion, and a plurality of coil spring receivers arranged or positioned circumferentially about and extending away from the main body of the lower housing portion; a sprocket plate comprising: an inner opening formed through a thickness of the sprocket plate, a plurality of sprocket teeth arranged or positioned circumferentially about an inner diameter of the inner opening, a plurality of engagement recesses, each engagement recess being defined between adjacent sprocket teeth, and a plurality of coil spring recesses arranged or positioned circumferentially about, and extending radially inwardly from, a perimeter of the sprocket plate; a tubeform assembly comprising: an inner member comprising: a mounting ring at a first longitudinal end of the inner member, a lower edge at a second longitudinal end (e.g., opposite the first longitudinal end) of the inner member, a bonding element in a form of an outer wall between the mounting ring and the lower edge, and a plurality of tangs attached to, and extending away from, the lower edge, the plurality of tangs arranged or positioned circumferentially around the lower edge; an outer member comprising: a bonding ring in a form of an outer wall that is substantially concentrically arranged or positioned about the bonding element of the inner member, and a flange extending away from the bonding ring, the outer member being rigidly secured to the sprocket plate via the flange; and a tubeform comprising an elastomeric material, wherein the tubeform is arranged or positioned between the bonding ring of the outer member and the bonding element of the inner member; wherein the tubeform assembly is arranged or positioned, relative to the sprocket plate, such that each of the plurality of tangs is positioned within a corresponding one of the plurality of engagement recesses; and a plurality of coil spring assemblies, each coil spring assembly comprising: an outer coil spring having a first end and a second end, and at least two coil spring holders, one of which is arranged or positioned at the first end of the outer coil spring and another of which is arranged or positioned at the second end of the outer coil spring, wherein each of the plurality of coil spring assemblies is positioned within a corresponding one of the plurality of coil spring recesses of the sprocket plate, such that the plurality of coil spring and the sprocket plate form a sprocket assembly; wherein the tubeform assembly is arranged or positioned on a first side of the sprocket assembly and secured to the sprocket plate; and wherein the upper housing portion is positioned on a first side of the sprocket assembly and disposed about the tubeform assembly and the lower housing portion is positions on a second side of the sprocket assembly, opposite the first side of the sprocket assembly.

In some embodiments, the coupling is a dual rate coupling.

In some embodiments of the coupling, the inner member comprises a circular opening in a center of the inner member; and the circular opening is adjacent to the circular wall of the lower housing portion.

In some embodiments, the coupling comprises a plurality of fastener holes arranged or positioned circumferentially about the sprocket plate and formed through the thickness of the sprocket plate.

In some embodiments of the coupling, the mounting ring has a plurality of holes formed through a thickness thereof in a direction of the lower edge.

In some embodiments, the coupling comprises a thrust bearing positioned around the inner member opening; wherein the lower housing portion and the thrust bearing have the sprocket assembly positioned on top of the thrust bearing with a portion of each of the plurality of coil spring assemblies positioned in one of the coil spring receivers of the lower housing portion.

In some embodiments of the coupling, the flange of the outer member is substantially perpendicular to the bonding ring.

In some embodiments of the coupling, the tubeform is bonded to the bonding element of the inner member and/or the bonding ring of the outer member.

In some embodiments, the coupling comprises a plurality of protrusions formed about opposing lateral sides and a radially inner side of the plurality of tangs, the plurality of protrusions comprising an elastomeric material.

In some embodiments of the coupling, the outer member is swaged into the tubeform after being bonded to the tubeform at the bonding ring thereof.

In some embodiments of the coupling, the plurality of protrusions are formed integrally with, or separate from, the tubeform.

In some embodiments of the coupling, the plurality of tangs, as well as the plurality of protrusions formed thereon, and the sprocket teeth are circumferentially distributed in an alternating pattern when the tubeform assembly and the sprocket plate are assembled together.

In some embodiments of the coupling, there is a gap between lateral surfaces of the protrusion and adjacent lateral edges of the engagement recesses, such that the inner member is rotatable, relative to the sprocket plate, until the gap is closed and the protrusion contacts the sprocket plate at a first angular position.

In some embodiments of the coupling, the tubeform is configured to react a rotary movement between the inner member and the sprocket plate, through the outer member, in shear to provide a first stage stiffness of the coupling.

In some embodiments of the coupling, after the protrusions are in contact with the sprocket teeth of the sprocket plate, the inner member and the sprocket plate are configured to rotate in unison at all angular positions beyond the first angular position.

In some embodiments of the coupling, when the inner member and the sprocket plate undergo a rotary movement beyond the first angular position, the sprocket plate is configured to exert a compressive force on the coil spring assemblies, such that the coil spring assemblies provide a second stage stiffness when compressed by the rotary movement of the of the inner member and the sprocket plate.

In some embodiments of the coupling, the second stage stiffness is greater than the first stage stiffness.

In some embodiments of the coupling, an arrangement pattern of the plurality of coil spring receivers of the lower housing portion mirrors an arrangement pattern of the plurality of coil spring receivers of the upper housing portion, wherein the opening of the lower housing portion comprises a ring having a plurality of bumps extending radially outwards from the opening of the lower housing portion.

In some embodiments of the coupling, a portion of each of the plurality of coil spring assemblies is positioned in one of the coil spring receivers of the upper and lower housing portions, respectively.

In some embodiments of the coupling, the bumps are positioned about the ring defining the opening of the lower housing portion, such that a radially inner surface of the protrusions contacts a corresponding one of the bumps when the inner member and the sprocket plate are rotated to a second angular position, the second angular position being a greater angular displacement than the first angular position.

In some embodiments of the coupling, contact between the protrusions and the bumps provides surface effect damping to the coupling, in addition to the first and second stage stiffnesses.

In some embodiments, the coupling comprises a plurality of securing points positioned about an outer circumference of respective flanges of the upper and lower housing portions, wherein the upper housing portion and the lower housing portion are secured together at the plurality of securing points.

In some embodiments of the coupling, one or more of the plurality of coil spring assemblies comprises an inner coil spring arranged or positioned concentrically within the outer coil spring, such that the inner coil spring is coaxial with the outer coil spring.

In some embodiments of the coupling, at least one of the coil spring holders comprises an inner ring, the inner ring of one coil spring holder capable of being inserted within the first end of the inner coil spring and the other coil spring holder capable of being inserted within the second end of the inner coil spring.

DETAILED DESCRIPTION

A dual rate torsional coupling is disclosed herein, the dual rate torsional coupling using both elastomeric and coil spring elements to be operable in transmitting high-torque inputs. The elastomeric element includes a bonded tubeform that rotatably interfaces with a sprocket element, in which the coil springs are captively retained. The elastomeric element is rotatable, relative to the sprocket element, to provide a first stage of torsional stiffness to the torsional coupling. After the elastomeric element has snubbed against the sprocket element, the coil spring elements are rotatably engaged (e.g., in compression) to provide a second stage of torsional stiffness. It is advantageous for the first stage to have a lower torsional stiffness value than the second stage. The coils springs and the bonded tubeform can be selected to provide a desired amount of torsional stiffness for each installation. The use of an elastomer in the bonded tubeform allows for a reduction and/or elimination of high frequency noise in the transition from the first stage to the second stage.

The dual rate coupling allows a softer initial stiffness which allows an engine to have a lower idle speed and reduces noise associated with gear rattle, while in neutral. Additionally, the torsional coupling disclosed herein has a safety mechanism, such that the dual rate torsional coupling is still able to transmit torque through the coil springs (e.g., the second stage) if the elastomeric element (e.g., the first stage) fails.

Figure 1A:
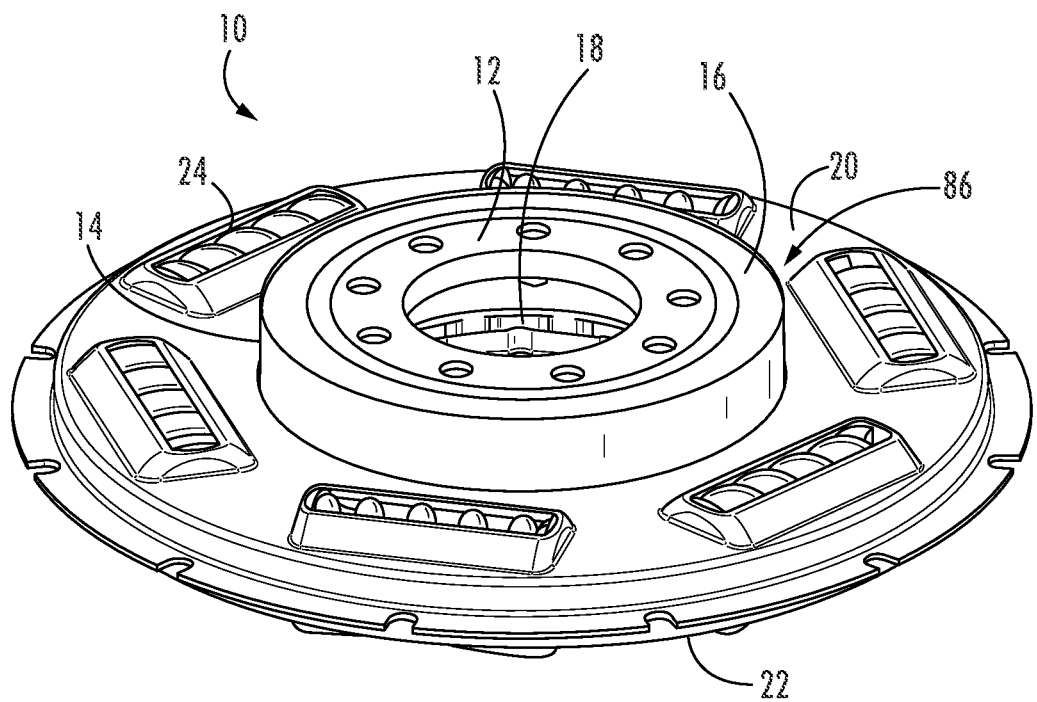
FIGS. 1A and 1B illustrate a top and bottom perspective view of a dual rate coupling.
Figure 1B:
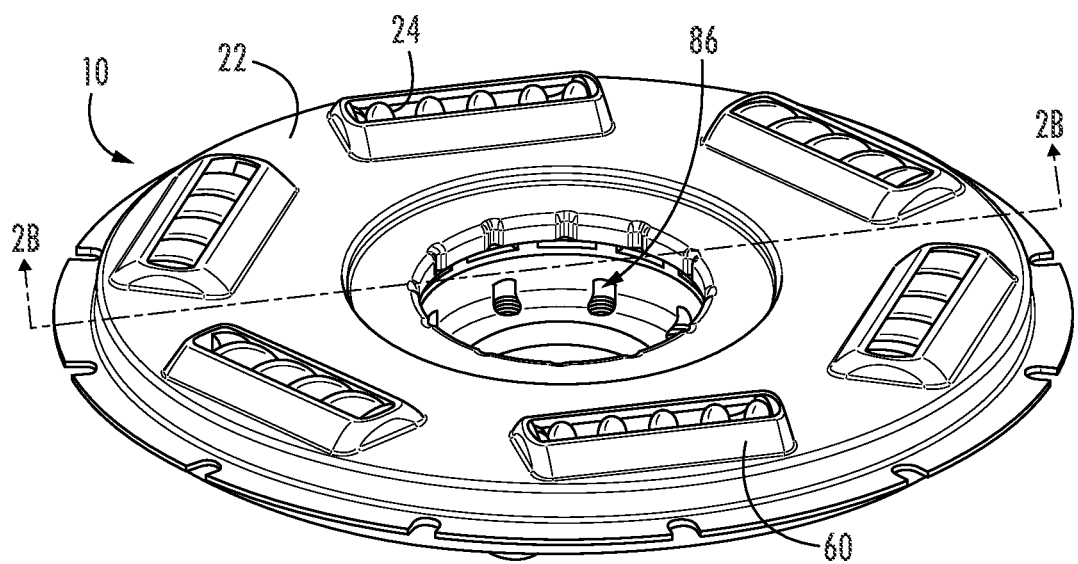

Referring to FIGS. 1A and 1B, a dual rate torsional coupling, generally designated 10, is illustrated in both a top and bottom isometric view. The coupling 10 comprises an inner member 12, an outer member 14, a tubeform 16, a sprocket plate 18, an upper housing portion 20, a lower housing portion 22, an outer coil spring 24, an inner coil spring 26, a coil spring holder 28, and a thrust bearing 29.

Figure 3A:
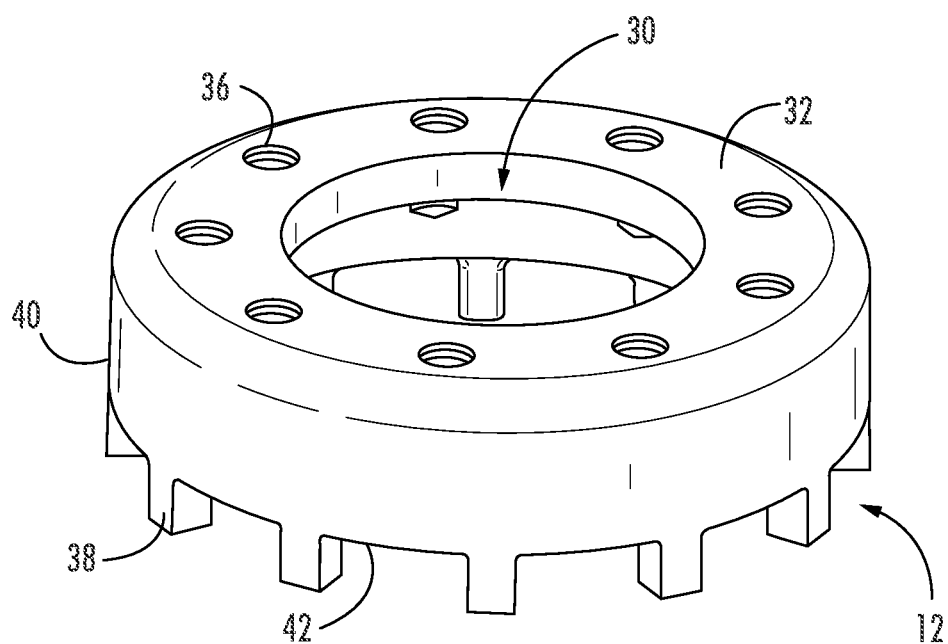
FIGS. 3A and 3B illustrate a top and bottom perspective view of an inner member of the dual rate coupling.
Figure 3B:
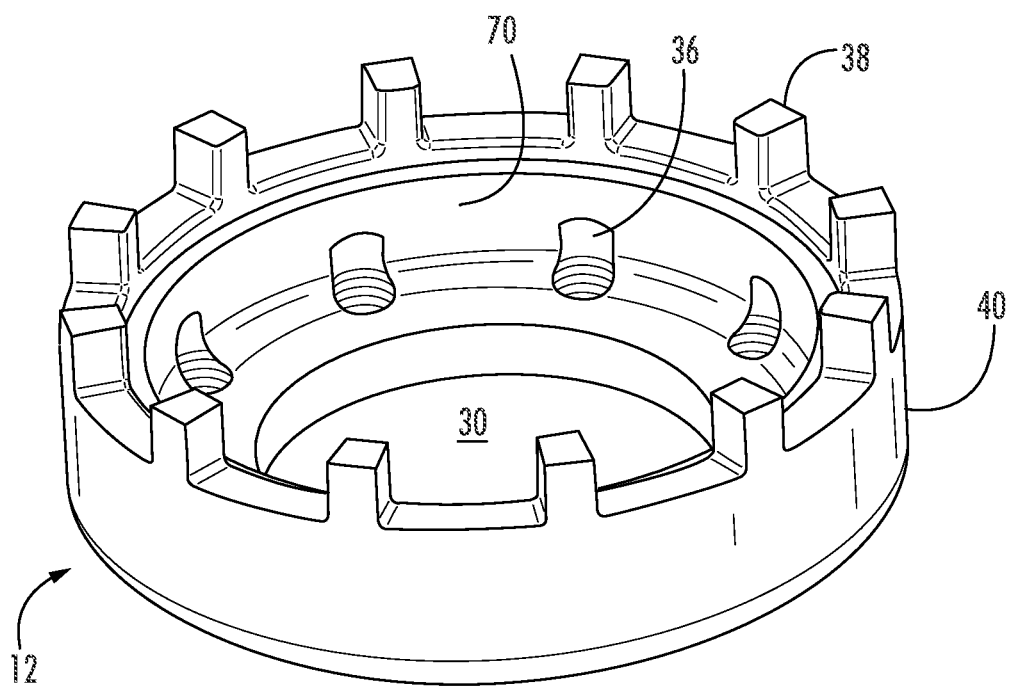

As shown in FIGS. 3A and 3B, the inner member 12 has a generally cylindrical shape. The inner member 12 has a mounting ring 32, a bonding element in the form of an outer wall 40, a plurality of bolt holes 36, and a plurality of tangs 38. The mounting ring 32 has a generally annular shape and defines a first end of the cylindrical shape of the inner member 12. The mounting ring 32 has an opening 30 centrally disposed through a thickness thereof in the longitudinal direction of the inner member 12, the opening 30 being sized to allow a shaft to pass therethrough. While the opening 30 is shown as having a generally circular profile, the opening 30 can have any size and/or shape based on the particular use and shaft for which the coupling 10 is being manufactured to be interconnected with. In the example embodiment shown, the inner member has a plurality of bolt holes 36 formed in, and extending partially or entirely through, the mounting ring 32. In some embodiments, inner member 12 may be connected to an input (e.g., an engine) or an output (e.g., a transmission) by, for example and without limitation, a splined interface, key ways, and/or taper lock hubs. Any suitably rigid connection between the inner member 12 and the inlet device or the outlet device may be provided without deviating from the scope of the subject matter disclosed herein.

The inner member 12 has an outer wall 40 extending away from the mounting ring 32 to define, along with tangs 38, a height or length (e.g., in the longitudinal direction of extension of the cylindrical shape of the inner member 12) of the inner member 12. The bolt holes 36 are circumferentially positioned and spaced about the mounting ring 32 between the outer wall 40 and the opening 30 of the inner member 12. The bolt holes 36 extend generally in the longitudinal direction of the inner member 12 and have an internal thread pattern configured for attaching the coupling 10 to either of an input or an output. The outer wall 40 extends in the longitudinal direction to a lower edge 42, from which each of the tangs 38 protrude in the longitudinal direction and/or circumferentially (e.g., inwardly). The outer circumferential surface of the outer wall 40 is configured as a bonding element to which the elastomeric tubeform 16 is bonded to couple the inner member 12 to the outer member 14. The inner member 12 comprises an inner wall 70, which is on a radially opposite surface from the outer wall 40 In one embodiment, the inner member 12 is machined from a ductile iron casting. However, any suitable material capable of reacting the loads and/or moments for a particular application and/or installation of the coupling 10 may be selected.

Figure 4:
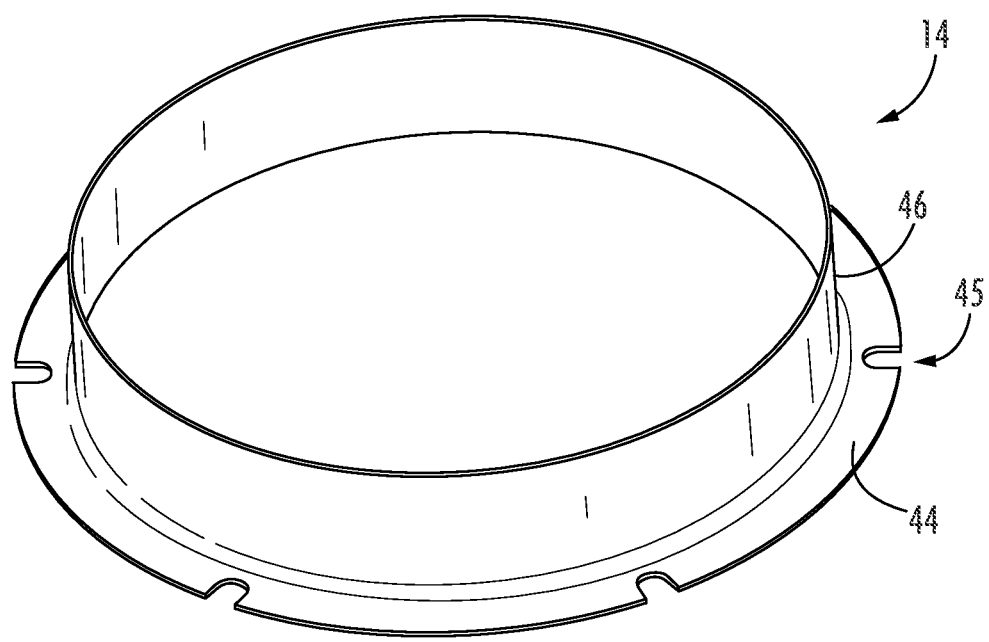
FIG. 4 illustrates a top perspective view of an outer member of the dual rate coupling.

As shown in FIG. 4, the outer member, generally designated 14, has a flange 44 and a bonding ring 46. The flange 44 is substantially perpendicular to the bonding ring 46 and extends away from the bonding ring 46 in a substantially radially oriented direction. The outer member 14 is arranged or positioned concentrically about the outer wall 40 of the inner member 12, such that the bonding ring 46 is adjacent to, but spaced apart from (e.g., by the tubeform 16), the outer wall 40 of the inner member 12. The flange 44 has a plurality of notches 45 formed therein, extending radially inwardly from a perimeter of the flange 44. The notches 45 are spaced circumferentially apart from each other about the flange 44. The positions at which the notches 45 are formed in the flange correspond to attachment positions (e.g., threaded holes) at which the outer member 14 is to be securely attached to the sprocket plate 18 to rotatably lock the outer member 14 with the sprocket plate 18 to prevent relative rotary movements therebetween. In some embodiments, the outer member 14 made of steel and can be formed by a stamping process. However, any suitable material capable of reacting the loads and/or moments for a particular application and/or installation of the coupling 10 may be selected.

Figure 9:
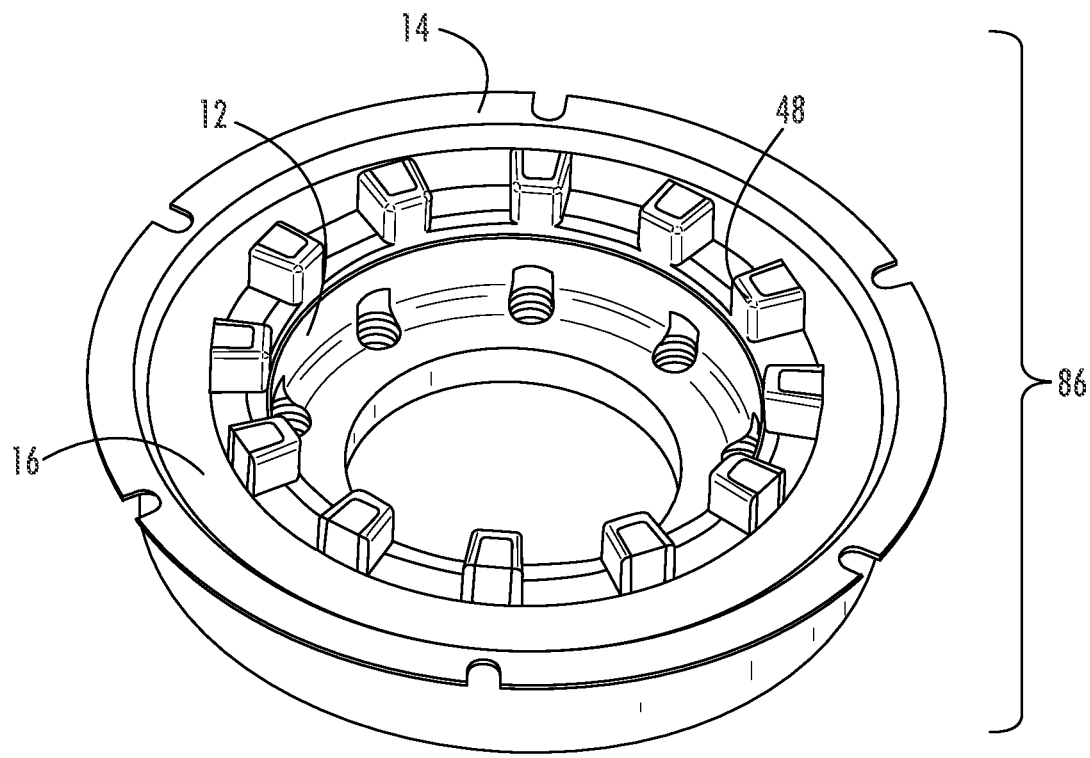
FIG. 9 illustrates a bottom perspective view of a tubeform of the dual rate coupling bonded between the inner member and the outer member.

FIG. 9 shows the inner member 12 and the outer member 14 assembled together, being adjoined by the tubeform 16, to form a tubeform assembly 86. The tubeform 16 is disposed concentrically around the inner member 12, such that the inner circumferential surface of the tubeform 16 is in contact with, and preferably bonded to, the outer wall 40 of the inner member 12. The tubeform 16 is arranged or positioned concentrically between the outer wall 40 of the inner member 12 and the bonding ring 46 of the outer member 14, so as to physically separate the inner member 12 from the outer member 14 about all or at least a portion of the circumference of the inner and outer members 12, 14 and prevent the inner member 12 from contacting, or being contacted by, the outer member 14 during operation of the coupling 10. Preferably, the tubeform 16 is bonded to one or both of the outer wall 40 of the inner member 12 and the inner wall of the bonding ring 46 of the outer member 14. The above are merely examples and it is contemplated that the tubeform 16 may be retained between the inner member 12 and the outer member 14 using any attachment mechanism that will allow the tubeform 16 to provide adequate damping performance. In the example shown, the inner member 12 is formed as a machined ductile iron casting and the outer member 14 is stamped from steel.

The tubeform 16 is further shown in FIG. 9 as being bonded to, and at least partially around, the tangs 38 of the inner member 12, thereby forming protrusions 48 made from the elastomeric material from which the tubeform 16 is formed. The protrusions are advantageously formed around at least both lateral sides of the tangs 38, which each extend in a radial plane of the inner member 12, and the inner circumferential surface of the tangs 38, as shown in FIG. 9. In some embodiments, the outer circumferential surface of the tangs 38 can be covered by the protrusions 48. The protrusions 48 are bonded to one or both of the tubeform 16 and an inner ring 49 formed on and/or in an inner circumferential channel of the inner member 12. In some embodiments, the tubeform 16 can be entirely and/or partially preformed and installed in the position between the inner member 12 and the outer member 14 shown in FIG. 9. In some embodiments, the tubeform 16 can be formed in situ, for example, by an injection molding technique. In some embodiments, the protrusions 48 and the inner ring 49 can be separable and/or physically distinct from the generally annular main body portion of the tubeform 16, defined as being between the inner member 12 and the outer member 14. In some embodiments, the protrusions 48 and the inner ring 49 can be formed so as to be integral to the main body portion of the tubeform 16. In some embodiments, the protrusions 48 and the inner ring 49 can be formed integral with each other and separable from the main body portion of the tube form and, in fact, the protrusions 48 and the inner ring 49 can be formed by a different technique (e.g., injection molding) from the method by which the tubeform 16 is formed.

Figure 5:
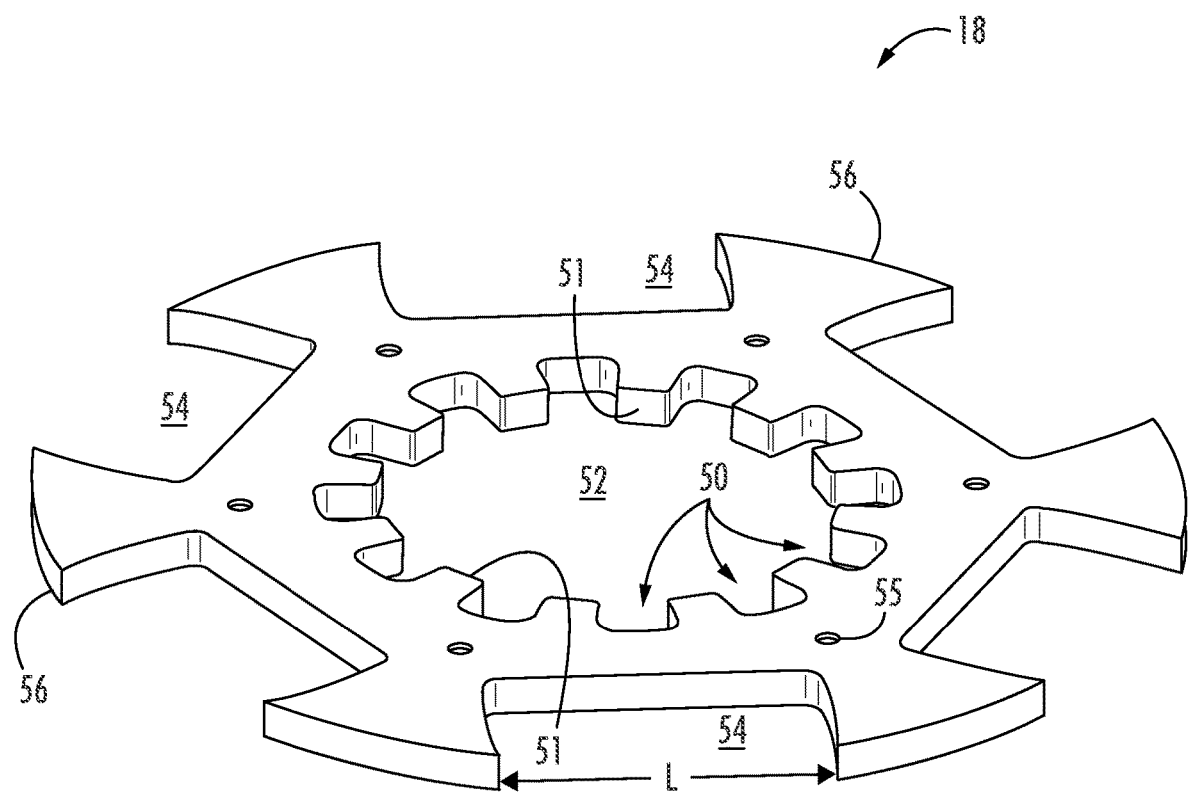
FIG. 5 illustrates a top perspective view of a sprocket plate of the dual rate coupling.

A sprocket plate, generally designated 18, is shown in FIG. 5. The sprocket plate 18 has an inner opening 52 formed therein. As shown, the inner opening 52 extends through a full thickness of the sprocket plate 18 to define a hole, or void, therein. The inner opening 52 is centrally located about (e.g., uniformly) a central axis of the sprocket plate 18. In some embodiments, the inner opening 52 may be offset from the central axis and/or have a non-uniform profile. The sprocket plate 18 has, at an inner circumferential surface thereof as defined by the outer circumference of the inner opening 52, engagement recesses, generally designated 50, formed therein to define sprocket teeth 51 spaced circumferentially about the inner circumferential surface of the inner opening 52, such that the engagement recesses 50 extend radially away from the inner circumferential surface of the inner opening 52, with each of the engagement recesses 50 being spaced apart from adjacent engagement recesses 50 by one of the sprocket teeth 51. The engagement recesses 50 are spaced circumferentially about the inner opening 52 in a pattern that is substantially identical to the pattern at which the tangs 38 of the inner member 12 are formed, such that the engagement recesses 50 are positioned so that each tang 38 (e.g., as formed in the protrusion 48) of the inner member 12 can be positioned within one of the engagement recesses 50 and spaced apart from each other by the sprocket teeth 51. As such, a corresponding protrusion 48 of the inner member 12 is positioned between each set of adjacent sprocket teeth 51.

The sprocket plate 18 has a plurality of coil spring recesses, generally designated 54, which are formed in and extend radially inwardly from an outer circumferential surface 56 of the sprocket plate 18. The coil spring recesses 54 are spaced circumferentially about the sprocket plate 18 and extend in the circumferential direction of the sprocket plate 18 to allow for installation of a coil spring assembly (88, FIG. 10) therein. The length L (e.g., measured in a direction tangential to the circumferential surface 56 where the coil spring recess 54 is formed) of each coil spring recess 54 is selected based on the uncompressed length of the coil spring assembly to be installed therein and the amount and/or degree of pre-compression specified for a specified application. The sprocket plate 18 has holes 55 formed in and/or at least partially (e.g., entirely) through the thickness thereof. The holes 55 are spaced about the sprocket plate 18 to align with the notches 45 formed in the flange 44 of the outer member 14 (see FIG. 4), such that fasteners can pass through the notches 45 and the holes 55 to rigidly couple the outer member 14 to the sprocket plate 18 to prevent and/or resist relative movements (e.g., torsional, lateral, and/or axial) between the sprocket plate 18 and the outer member 14. The sprocket plate 18 may be stamped, laser cut, and/or formed steel. However, any material and type of forming may be used in forming the sprocket plate 18 that will produce a sprocket plate 18 having suitable strength, thickness, and material properties for a specific application. In an example embodiment, the sprocket plate 18 has a thickness of about 0.5 inches (in), however, the thickness may be selected based on the torque to be transmitted. In some preferred embodiments, the sprocket plate 18 has a rounded profile to aid in assembly (e.g., insertion of a coil spring assembly in a unitary manner) of the sprocket assembly (see, e.g., 90, FIG. 10) and prevent the coil spring assemblies from being dislodged from the coil spring recesses 54 during normal operation.

Figure 6A:
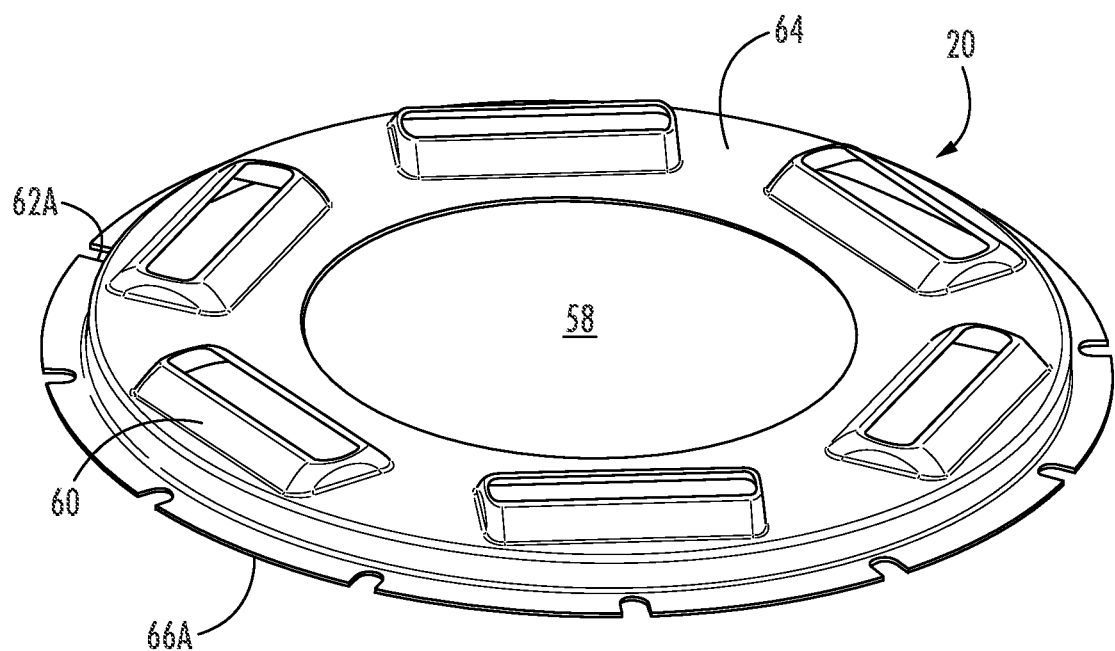
FIGS. 6A and 6B illustrate a perspective view of an upper and lower housing portions of the dual rate coupling.
Figure 6B:
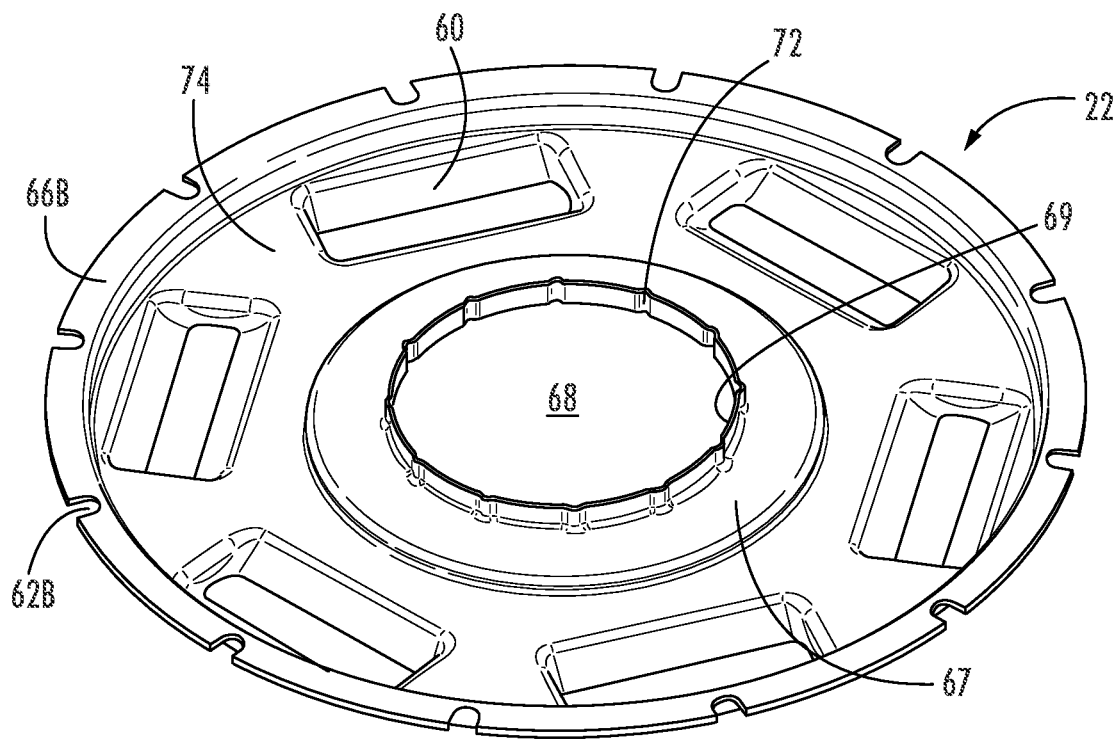

Referring to FIGS. 6A and 6B, example embodiments of an upper housing portion, generally designated 20, and a lower housing portion, generally designated 22, are shown, respectively. In the example embodiment shown, the upper and lower housing portions 20, 22 are substantially mirror images of each other, with the exception of the central portions thereof. As shown in FIG. 6A, the upper housing portion 20 has a central opening 58 formed through a thickness thereof to define a hole. The upper housing portion 20 has a flange 66A extending radially away from a main body 64 of the upper housing portion 20, the flange 66A being offset from (e.g., not coplanar to) the main body 64 of the upper housing portion 20. The flange 66A and the main body 64 can be parallel or inclined relative to each other. The lower housing portion 22 has a flange 66B extending radially away from a main body 74 of the lower housing portion 22, the flange 66B being offset from (e.g., not coplanar to) the main body 74 of the lower housing portion 22. The flange 66B and the main body 74 can be parallel or inclined relative to each other. The flanges 66A, 66B of the upper and lower housing portions 20, 22 have respective notches 62A, 62B formed therein, which are configured to have a fastener affixed thereto to secure the upper housing portion 20 against the lower housing portion 22. In some embodiments, the upper and lower housing portions 20, 22 are connected to either of an input or an output (e.g., to whichever the inner member 12 is not connected) at any portion of the upper and lower housing portions 20, 22, including, for example, at flanges 66A, 66B by passing fasteners through the notches 62A, 62B and into the input or the output (e.g., a shaft connected to the input or the output). The opening 58 formed in the upper housing portion 20 is shaped so that, when the tubeform assembly (86, FIG. 9) is attached to the sprocket assembly (90, FIG. 10) and the upper and lower housing portions 20, 22 are secured about the sprocket assembly 90, the opening 58 is positioned adjacent to the outer surface of the bonding ring 46 of the outer member 14. The upper and lower housing portions can be formed by any suitable technique, including a stamping technique.

Each of the upper and lower housing portions 20, 22 have coil spring receivers 60 formed in the respective main bodies 64, 74 thereof. Each of the coil spring receivers 60 are sized to accept a portion of an outer coil spring 24 (e.g., an arcuate portion of a whole length thereof) of the sprocket assembly 90 therein when the upper and lower housing portions 20, 22 are secured about the sprocket assembly 90. Each coil spring receiver 60 formed in the upper housing portion 20 is substantially identical to a corresponding one of the coil spring receivers 60 formed in the lower housing portion 22. As such, the arrangement, sizes, and shapes of the coil spring receivers 60 formed in the upper housing portion 20 is substantially identical (e.g., is mirrored about a plane defined by the flanges 66 of the upper and lower housing portions 20, 22 when assembled together). In some embodiments, two or more sets of spring assemblies (88, FIG. 10) may be installed in a single sprocket assembly 90, each spring assembly 88 of each set of spring assemblies 88 has a same length, but all of the spring assemblies 88 of, for example, a first set of spring assemblies 88 may have a different length from all of the spring assemblies 88 of, for example, a second (or third, fourth, et seq.) set of spring assemblies 88 of the sprocket assembly 90. The different lengths in the first, second, third, et seq. sets of spring assemblies 88 can be, for example and without limitation, from one or more of using coil springs (see 24, 26, FIGS. 7A, 7B) that have different uncompressed lengths, applying a greater amount or degree of pre-compression to the coil spring assemblies 88, and the like. In embodiments in which the sprocket assembly 90 uses two or more different sets of spring assemblies 88, it is advantageous to mirror the distribution of these different sets of spring assemblies 88 radially about the longitudinal axis of the sprocket assembly 90 and/or the coupling 10 to avoid imparting moments to the sprocket that could cause cocking or other misaligning movements of the sprocket assembly 90 within the housing formed by the upper and lower housing portions 20, 22.

The lower housing portion 22 has a thrust bearing surface 67 that extends radially inwardly from the main body 74 towards and opening 68 formed in the central area of lower housing portion 22. The thrust bearing surface 67 is preferably not coplanar with (e.g., is vertically offset from) the main body 74 of the lower housing portion 22. The opening 68 is formed through a thickness (e.g., partially or entirely) of the main body 74 of the lower housing portion 22. The opening 68 is smaller (e.g., in diameter) than the opening 58 formed in the main body 64 of the upper housing portion 20. The opening 68 is defined by a ring 69 having a substantially annular shape and extending substantially orthogonally away from the thrust bearing surface 67 and, when the upper and lower housing portions 20, 22 are assembled about a sprocket assembly 90, which is in turn attached to a tubeform assembly 86, the wall defining the opening 68 is arranged or positioned and held substantially adjacent to the inner wall (70, FIG. 3B) of the inner member 12. The opening 68 provides the pilot diameter of the coupling 10. The lower housing portion 22 also has bumps 72 formed in the wall of the opening 68. The bumps 72 extend radially outwards from the wall of the opening such that the bumps are capable of contacting, or being contacted by, the protrusions 48 of the tubeform assembly 86 when the inner member 12 is rotated, along with the sprocket assembly 90 and relative to the lower housing portion 22, to undergo a sufficiently large displacement as the result of a torsional input to the coupling 10. This contact between the bumps 72 and the protrusions 48 provides surface effect damping during large amplitude rotary displacements of the components of the coupling 10, such as between the tubeform assembly 86, along with the sprocket assembly 90 when the protrusions 48 are laterally engaged against (e.g., in contact with) the side walls of the sprocket teeth 51, and the bumps 72 formed in the ring 69 of the lower housing portion 22, such that the bumps 72 extend radially outwards from the ring 69 in the direction of the sprocket plate 18, the flanges 66A/66B of the upper and/or lower housing portions 20, 22, and the like.

The lower housing portion 22 has coil spring receivers 60 formed in the main body 74 thereof and protruding out from (e.g., so as to be non-planar to) the main body 74. The is flange 66B of the lower housing portion 22 is shown as being offset from the main body 74 in a direction that is opposite from the direction in which the coil spring receivers 60 are offset from the main body 74. When in an assembled orientation (e.g., when the upper and lower housing portions 20, 22 are positioned relative to each other for assembly about the sprocket assembly 90), the flanges 66A, 66B extend away from the respective main bodies 64, 74, such that the flanges 66A, 66B are arranged or positioned adjacent to each other (e.g., in direct contact with, or only being separated by a gasket). In the assembled orientation, the main bodies 64, 74 of the upper and lower housing portions 20, 22 are spaced apart from each other by a distance greater than the thickness of the sprocket plate 18, the main bodies 64, 74 being spaced apart from the respective flanges 66A, 66B by a band, ring, or ridge of material. In the assembled orientation, the coil spring receivers 60 of the upper housing portion 20 extend away from the main body 64 in an opposite direction from the direction in which the coil spring receivers 60 of the lower housing portion 22 extend away from the main body 74, such that a cavity in which a corresponding one of the coil spring assemblies 88 is formed between each aligned pair of coil spring receivers 60 in the upper and lower housing portions 20, 22, and with which the coil spring recesses 54 formed in the sprocket plate 18 are also aligned.

In some embodiments, the upper and lower housing portions 20, 22 are stamped from a steel, or ferrous, material, but any material providing the suitable strength, thickness and similar material properties will work as is known to those having skill in the art, including, for example, aluminum. In the example embodiment shown, which is made from steel, the thickness of upper and lower housing portions 20, 22 is between 0.04 and about 0.08 inches, with a preferred thickness of about 0.06 inches. In some embodiments, the upper and/or lower housing portions 20, 22 can be manufactured to any dimensions necessary for an application.

Figure 2A:
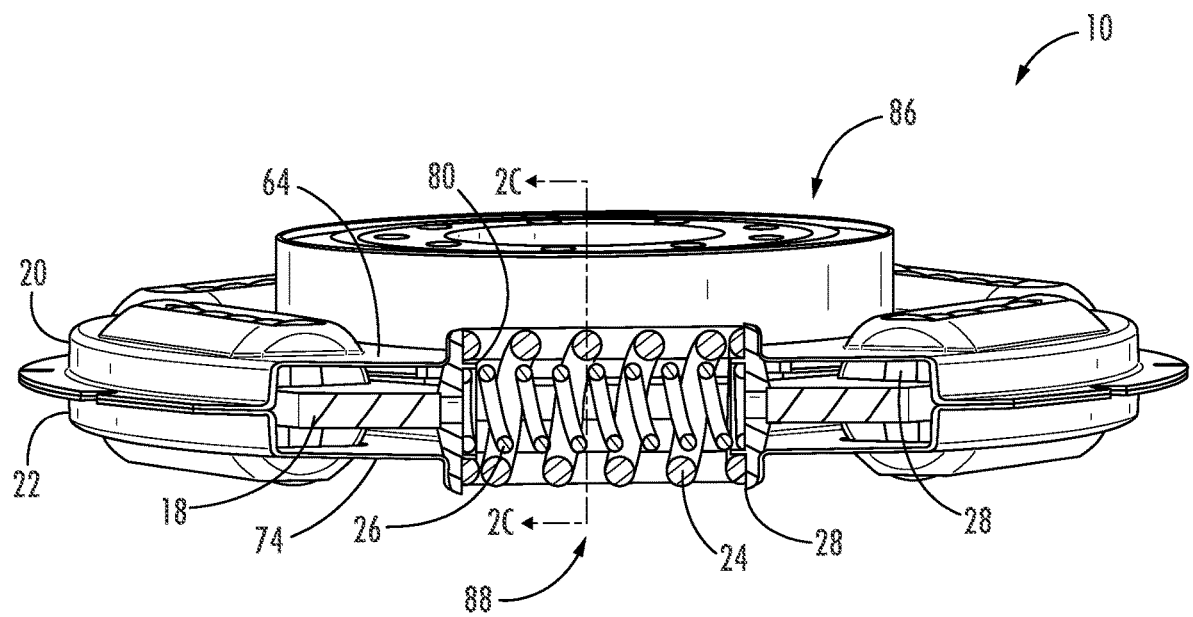
FIG. 2A illustrates a side view of the dual rate coupling.
Figure 2B:
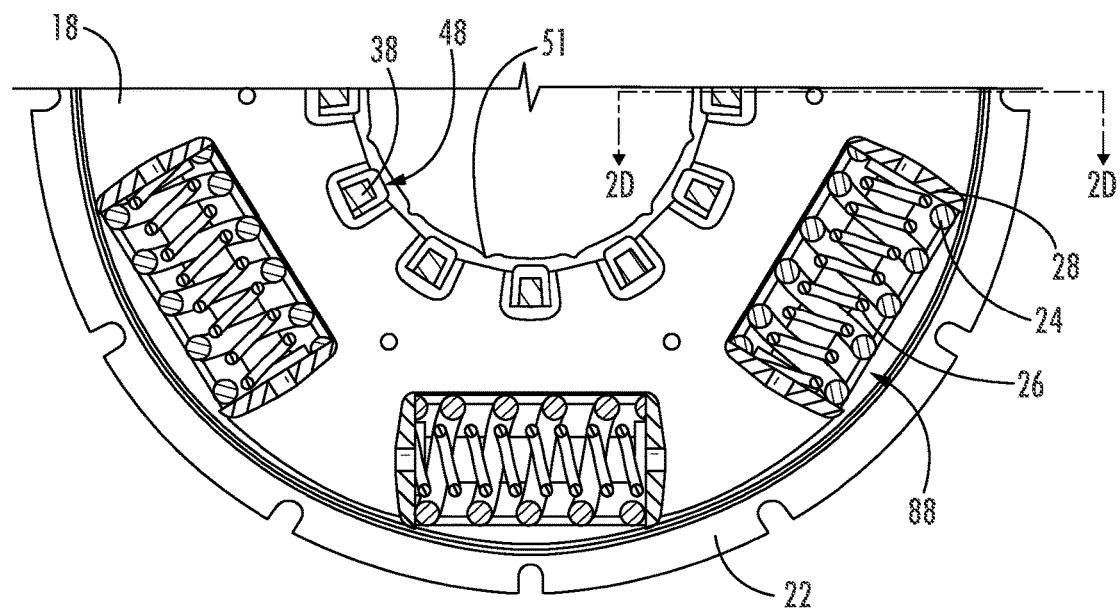
FIG. 2B illustrates a top-sectional view of the dual rate coupling taken from FIG. 1A along line 2B-2B.
Figure 2C:
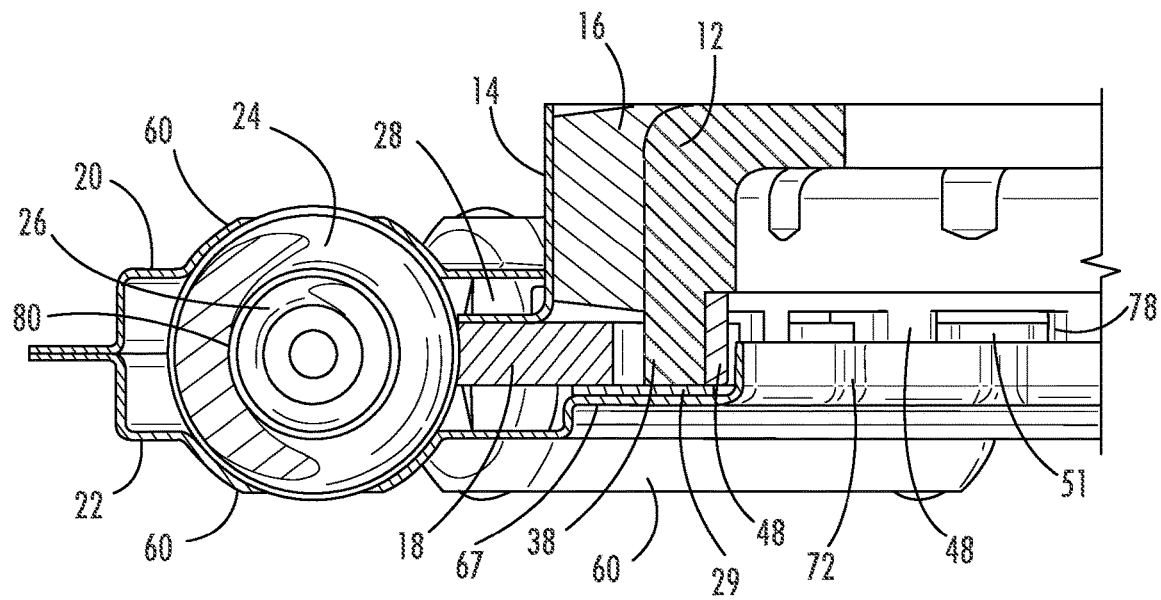
FIG. 2C illustrates a side-sectional view of the dual rate coupling taken from FIG. 2A along line 2C-2C.
Figure 2D:
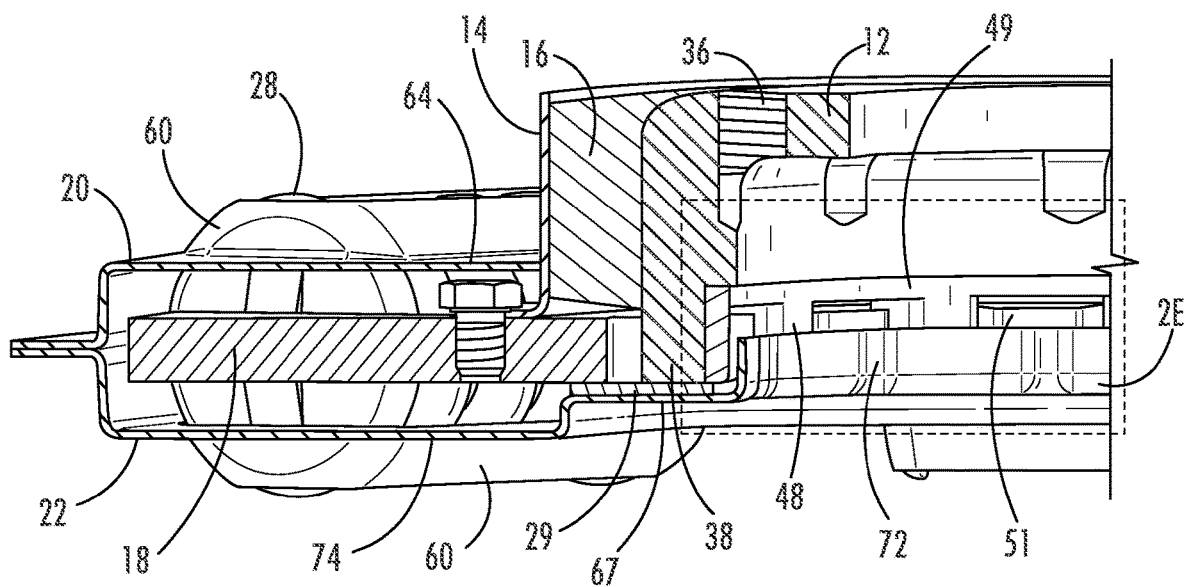
FIG. 2D illustrates a side-sectional view of the dual rate coupling taken from FIG. 2B along line 2D-2D.
Figure 2E:
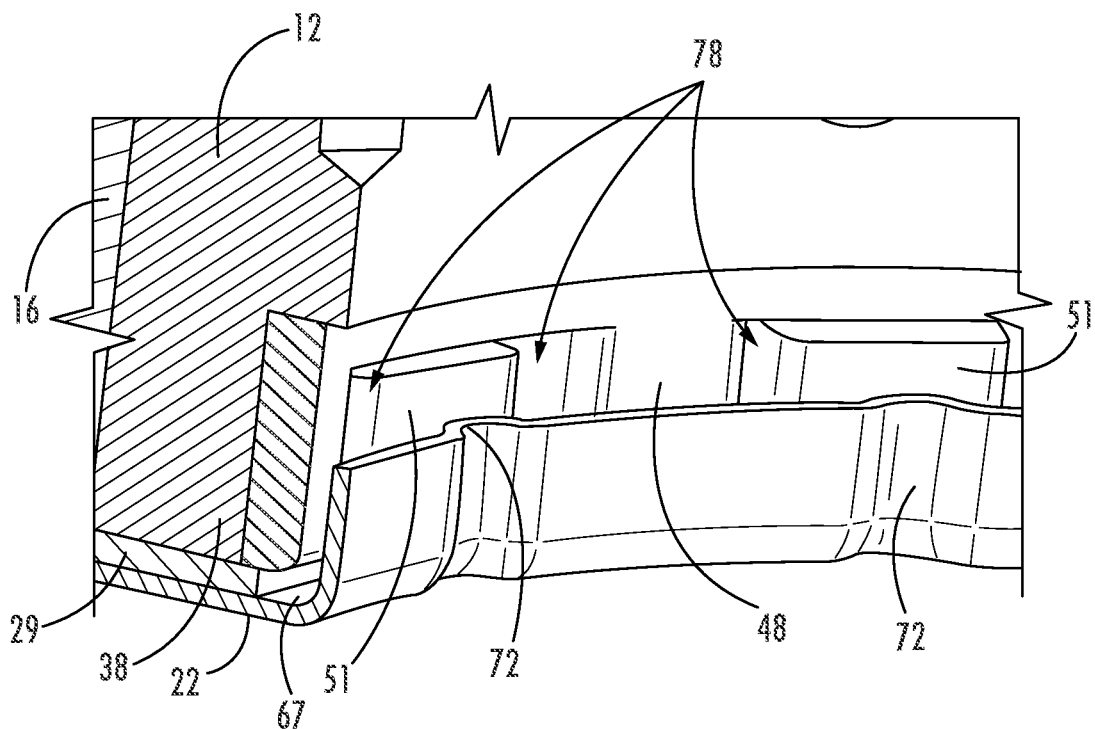
FIG. 2E illustrates a perspective detail view of the inner member of the dual rate coupling taken from FIG. 2D.

FIG. 2E shows a partial sectional view of the coupling 10 in an assembled configuration. As shown in FIG. 2E, the tubeform 16 has a plurality of protrusions 48 that surround, at least partially or wholly, the tangs 38 formed in the inner member 12. It is advantageous for each protrusion to be bonded against at least the lateral and radially inner surfaces of a corresponding one of the tangs 38. In the assembled state shown, each tang 38, along with the protrusion 48 associated therewith, is arranged or positioned within one of the engagement recesses 50 formed in inner radial surface of the sprocket plate 18, as defined by the gaps between adjacent sprocket teeth 51. Since the protrusions 48 have a width (e.g., in the circumferential direction of the inner member 12) that is smaller than the width (e.g., in the circumferential direction of the sprocket plate 18) of the engagement recess 50 in which the protrusion is positioned, there is a gap 78 defined between the lateral edges of each protrusion 48 and the lateral edges of the engagement recess in which each protrusion 48 is positioned. The gap 78 allows for rotational movement of the protrusions 48, along with the inner member 12, towards a lateral edge of the engagement recess 50 in which the protrusion 48 is positioned.

After the inner member 12 has rotated, relative to the sprocket plate 18, by an amount corresponding to the gap 78 between the protrusions 48 and one of the lateral edges of the engagement recesses 50, the lateral wall of the protrusion 48 is engaged against (e.g., pressed against in the circumferential direction) the side edge of a corresponding one of the engagement recesses 50 of the sprocket plate 18, the lateral surface of the protrusion providing compliant engagement (e.g., as a rubber-like layer) between the sprocket plate 18 and the tangs 38. The protrusions 48 and tangs 38 are each held in an undeflected position (e.g., when no rotary force is being imparted) within one of the engagement recesses 50 by the tubeform 16, which reacts rotary movements between the inner member 12 and the outer member 14, which is rigidly attached to the sprocket plate 18, such that the inner member 12 returns to the undeflected state, relative to the outer member 14 and, hence, the sprocket plate 18 when no rotary force is being imparted to the inner member 12. In some embodiments, the gaps 78 on opposing sides of the protrusions 48 can be substantially uniform (e.g., being designed for uniformity, but allowing for tolerances during manufacture and assembly that may result in slight misalignments) between the lateral edges of the engagement recesses 50. In other embodiments, the position of the protrusions 48 and tangs 38 within the engagement recesses 50 can be staggered, or offset, in the circumferential direction such that the gap 78 between the protrusion 48 and the engagement recess 50 is different (e.g., smaller or larger) on a first lateral side of the protrusion 48 than on a second lateral side of the protrusion 48, opposite the first lateral side in the circumferential direction. In some embodiments, the position of the protrusions 48 and tangs 38 within the engagement recesses 50 can be staggered, or offset, in the circumferential direction such that the protrusion 48 is adjacent to, or in contact with, a lateral edge of the engagement recess 50 in a first direction, such that there is no gap, or only a nominal gap, between the lateral surface of the protrusion 48 and the lateral edge of the engagement surface 50 in the first direction, with the gap 78 being present only between a second lateral surface of the protrusion and the lateral edge of the engagement surface in a second direction, opposite the first direction.

Additionally, after the inner member 12 has been radially displaced by a first angular distance to a first angular position in the circumferential direction for the protrusions to contact one of the lateral edges of the engagement recesses 50, the inner member 12, the outer member 14, and the sprocket plate 18 move in a unitary manner when radially displaced beyond the first angular position and the coil spring assemblies 88 are engaged to provide a second, increased, stiffness to the coupling 10 to resist and/or react further angular displacement beyond the first angular position. When a rotary force of sufficient magnitude is imparted to the coupling 10 (e.g., through the inner member 12), to cause the inner member 12, the outer member 14, and the sprocket plate 18 to be rotationally displaced beyond the first angular position, the inner member 12, the outer member 14, and the sprocket plate 18 will continue to rotate within the housing defined by the upper and lower housing portions 20, 22 as the coil springs 24, 26 are compressed within the coil spring recesses 60 formed in the upper and lower housing portions 20, 22 until the inner member 12, the outer member 14, and the sprocket plate 18 have been radially displaced by a second angular distance to a second angular position, which is further radially displaced than the first angular position. At this second angular position, the protrusions 48 are positioned adjacent to the bumps 72 formed in the ring 69 of the lower housing portion 22. Upon the coupling 10 receiving (e.g., at the inner member 12) a rotary force of sufficient magnitude, the inner member 12, the outer member 14, and the sprocket plate 18 rotate beyond the second angular position, such that the radially inwardly-facing surface of the protrusions 48 make contact with, and are at least to some degree radially compressed by, the bumps 72 to create surface effect damping during large displacements (e.g., beyond the second angular position) of the coupling 10.

Figure 7A:
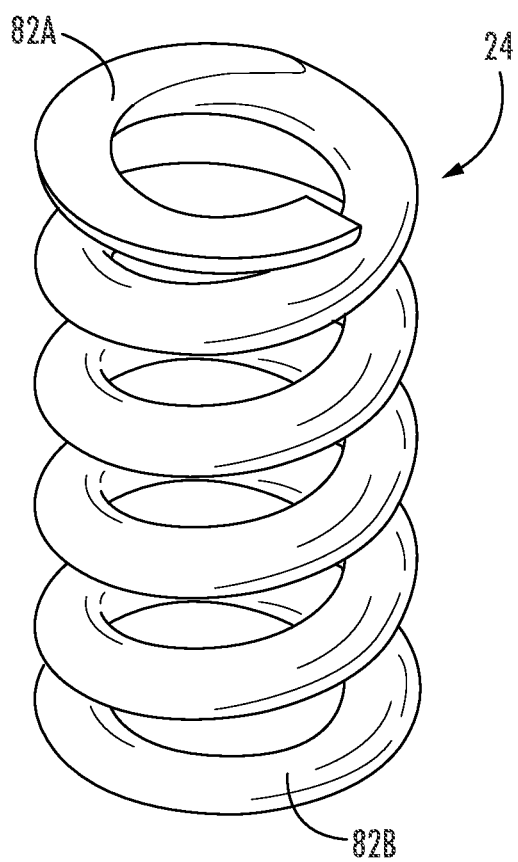
FIGS. 7A and 7B illustrate a perspective view of an outer coil spring and an inner coil spring of the dual rate coupling.
Figure 7B:
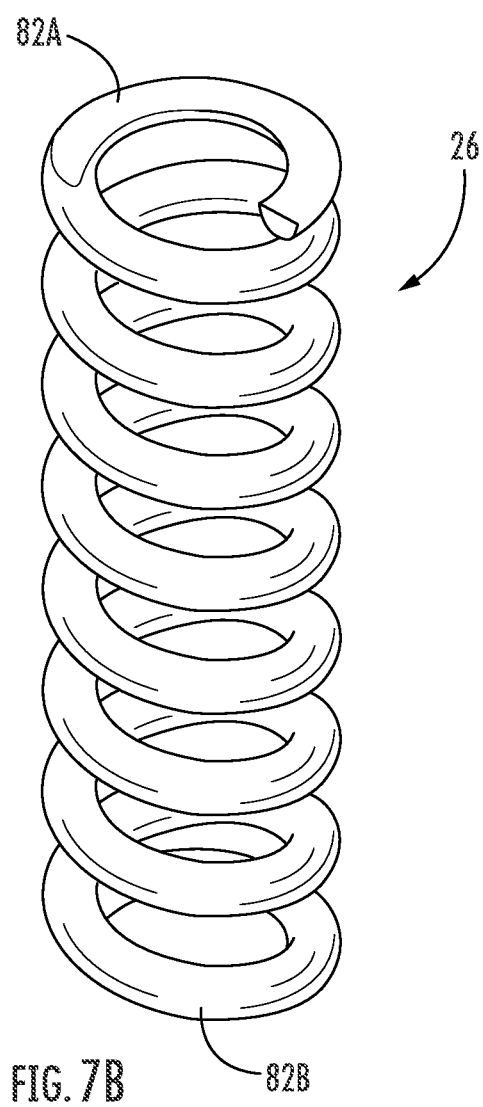
Figure 8A:
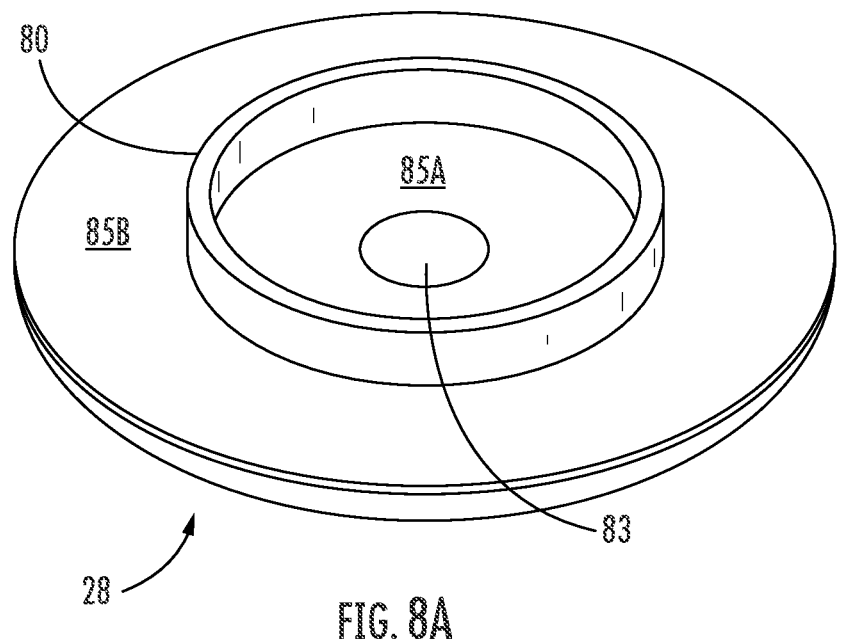
FIGS. 8A and 8B illustrate a coil spring holder for the outer coil spring and the inner coil spring.
Figure 8B:
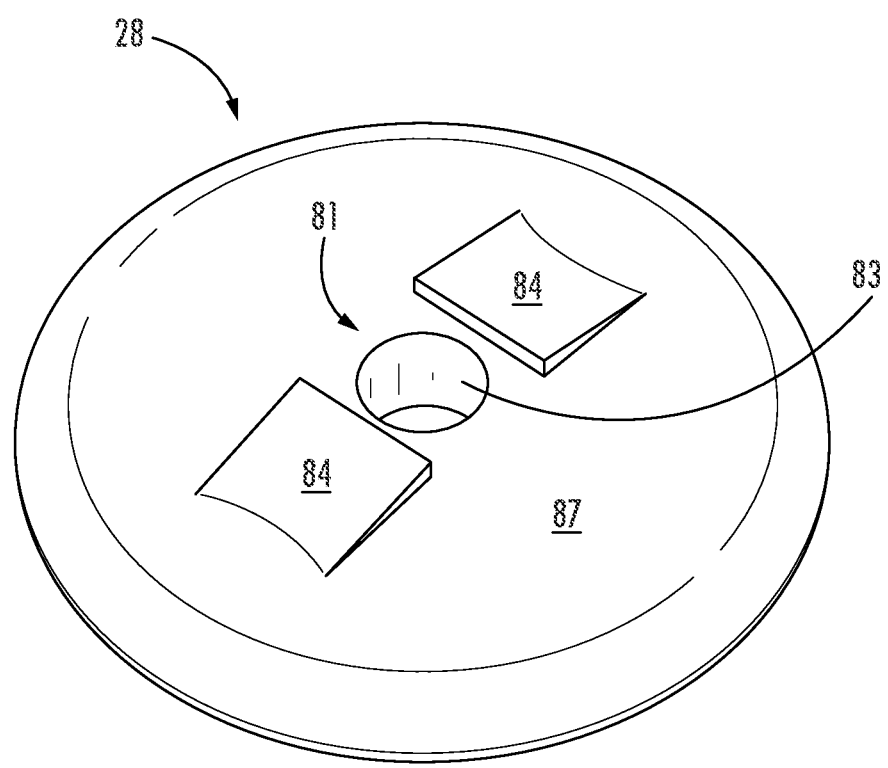

FIGS. 7A and 7B show example embodiments of outer and inner coil springs 24 and 26, respectively. The outer and inner coil springs 24, 26 may be selected to have identical or different uncompressed lengths. The amount of allowable travel and/or compression for the outer and inner coil springs 24, 26 is based on the torque and stiffness needed for a given application. In order to form a coil spring assembly 88, the inner coil spring 26 is disposed within the outer coil spring 24 spring, which are held together by a coil spring holder 28, various aspects of which are shown in FIGS. 8A and 8B. In the example embodiment shown in FIG. 8A, the coil spring holder 28 has a circumferential wall 80 extending (e.g., in the axial, or lengthwise, direction of the coil spring assembly 88) from the inner contact surface of the coil spring holder 28 to secure the outer and inner coil springs 24, 26 within the coil spring assembly 88 and to prevent direct contact between the outer and inner coil springs 24, 26, at least while the coil spring assembly 88 is in an undeflected state and, preferably, over the entire range of compression of the coil spring assembly 88. The wall 80 has a same, substantially similar (e.g., allowing for manufacturing tolerances), or larger inner diameter than the outer diameter of the inner coil spring 26, at least at the end 82A of the inner coil spring 26 where the inner coil spring 26 is in compressive contact against the radially inner contact surface 85A of the coil spring holder 28. The wall 80 has a same, substantially similar (e.g., allowing for manufacturing tolerances), or smaller outer diameter than the inner diameter of the outer coil spring 24, at least at the end 82A of the outer coil spring 24 where the outer coil spring 24 is in compressive contact against the radially outer contact surface 85B of the coil spring holder 28. In some embodiments (e.g., in those having only a single coil spring), the wall 80 may be omitted.

The coil spring assembly 88 has another coil spring holder 28, which can in some embodiments omit, but preferably includes, the wall 80, that contacts the ends 82A, 82B of the inner and outer coil springs 26, 24 and defines an outer axial boundary of the coil springs assemblies 88. The coil spring holders 28 have a hole 83 formed through the thickness (e.g., entirely) of the coil spring holder 28. The holes 83 are aligned with each other, when the coil spring assemblies 88 are in an assembled state, and are configured to have an axially-oriented longitudinal member (e.g., a bolt, elongated rivet, etc. that passes within the inner circumference of the inner coil spring 26 and allows an undeflected, or nominal, length of each coil spring assembly 88 to be defined at a maximum value, which can correspond to the length L of one of the coil spring recesses 54 of the sprocket plate 18 in which the coil spring assembly 88 will be inserted during assembly of the coupling 10. The longitudinal member is advantageous in that it provides a rigid connection between the opposing coil spring holders 28 to prevent, or at least minimize, lateral deflections or distortions of the coil spring assemblies 88. The thickness, undeflected length, diameter, spring coefficient, material, and any other parameter of the outer and inner coil springs 24, 26 may be selected to provide a desired amount of damping to the coupling when the second stage stiffness is engaged. In some embodiments, the outer and inner coil springs 24, 26 may have different compressed spring lengths, for example, in embodiments wherein the radially inner contact surface 85A of the coil spring holder 28 is staggered, or offset from, (e.g., not coplanar with) the radially outer contact surface 85B of the coil spring holder 28, such that, when the coil spring assembly 88 is in the assembled state, the inner coil spring 26 can have a length that is shorter or longer than a length of the outer coil spring 24.

Figure 10:
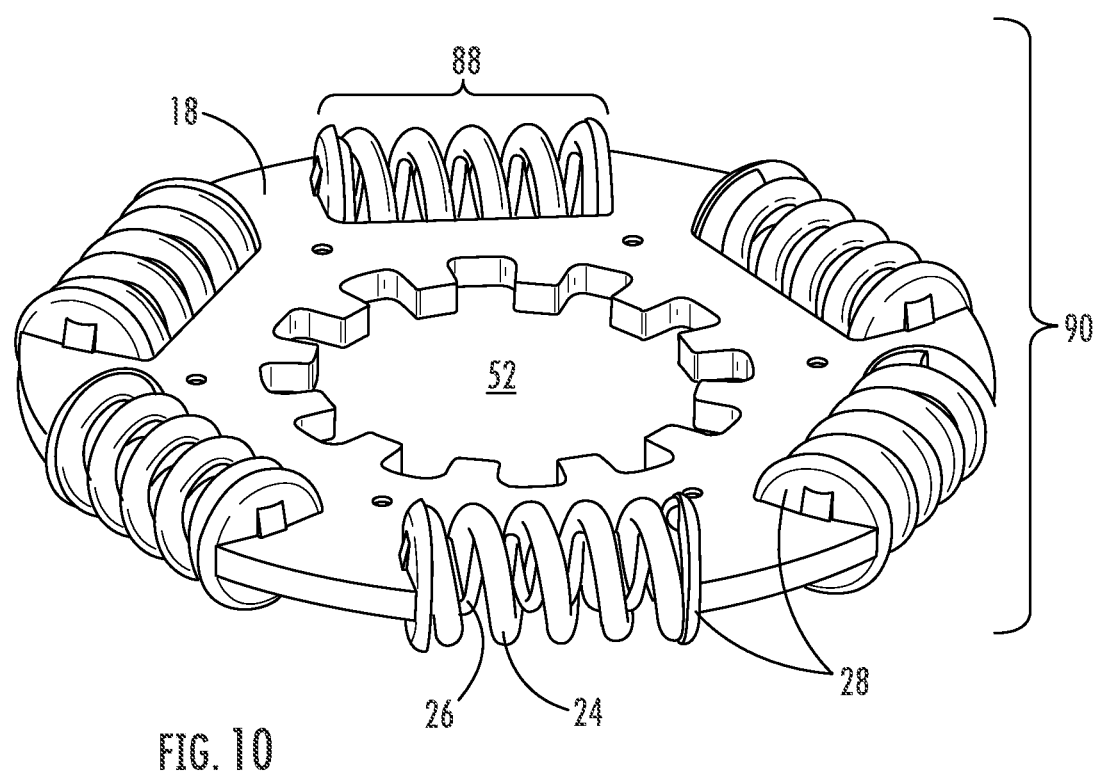
FIG. 10 illustrates a top perspective view of the outer coil spring positioned in the sprocket plate of the dual rate coupling with the inner coil spring nested within the outer coils spring.
Figure 11A:
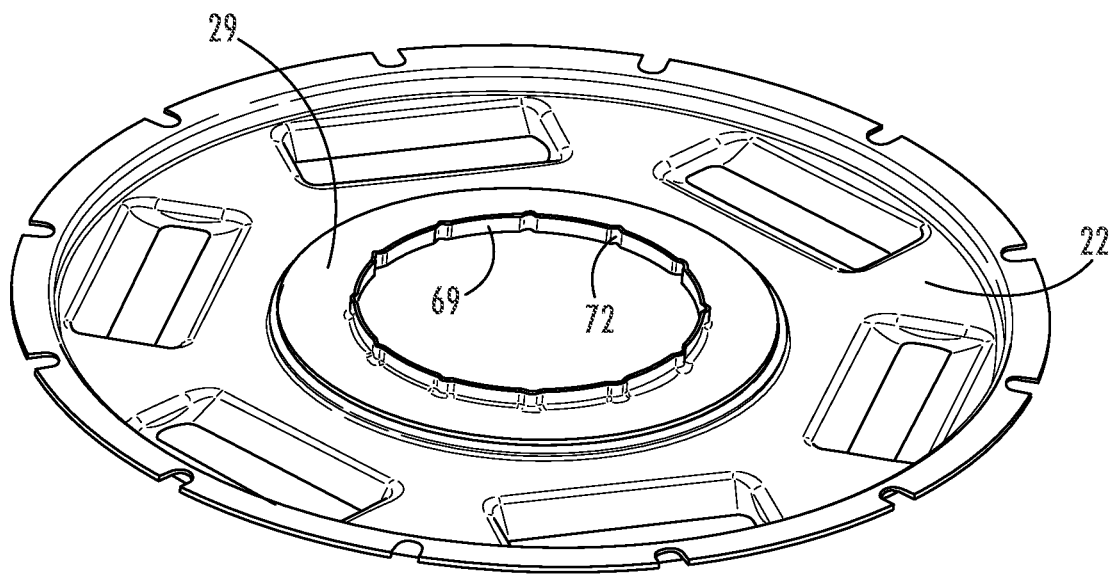
FIGS. 11A-11D illustrate the process to assemble the dual rate coupling.
Figure 11B:
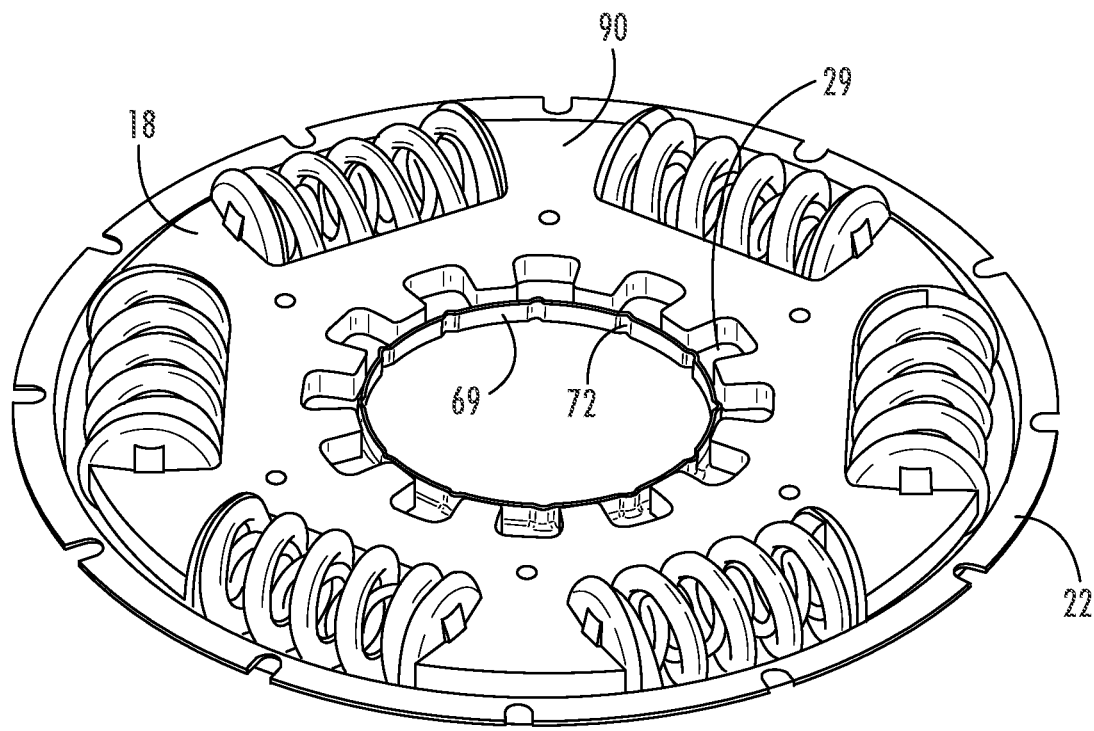
Figure 11C:
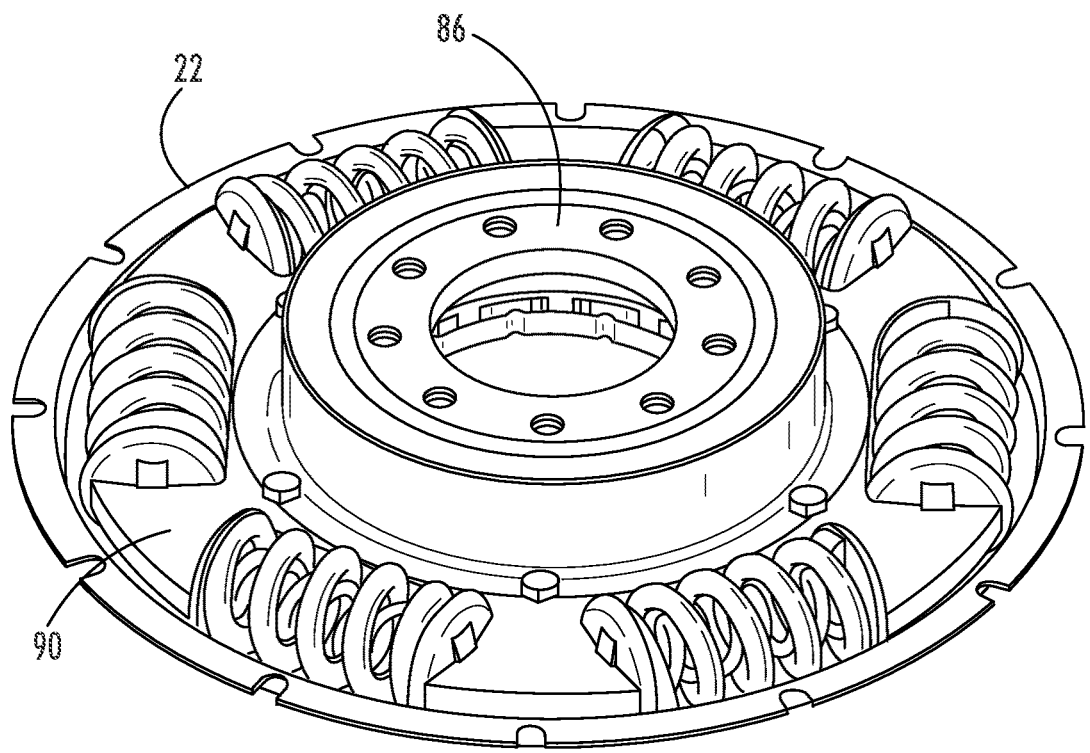
Figure 11D:
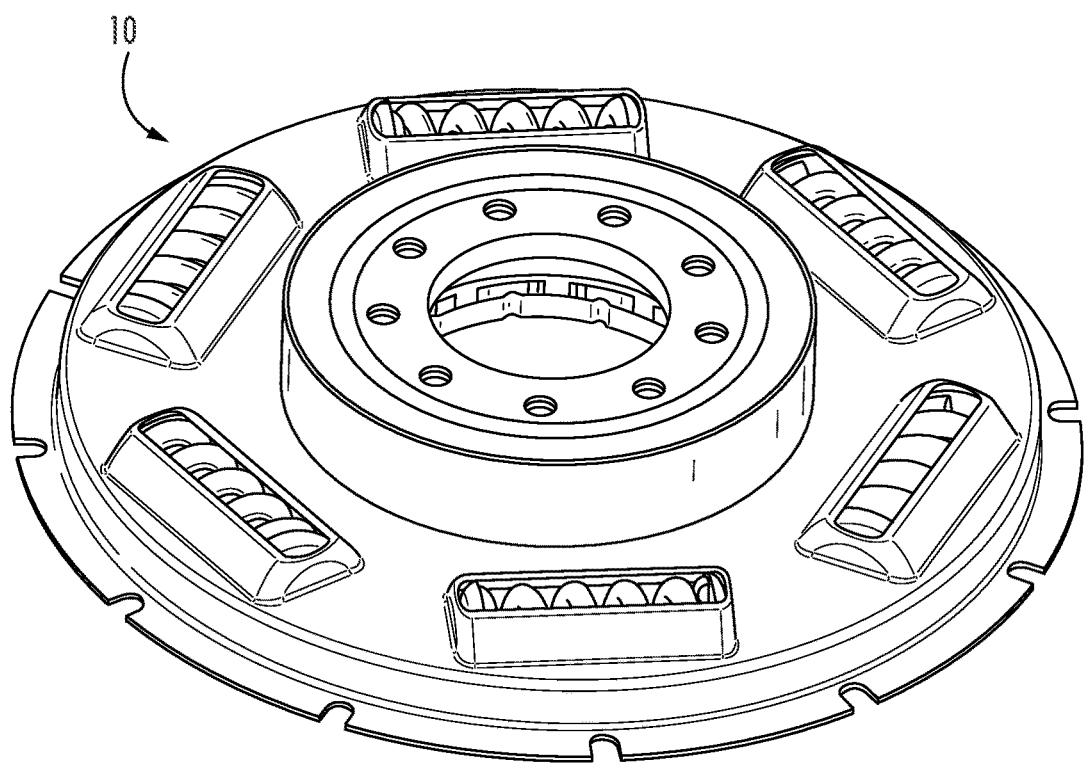

As shown in FIG. 8B, the coil spring holders 28 advantageously have opposing sprocket alignment tabs 84 protruding from the sprocket-interface surface 87 thereof. The sprocket alignment tabs 84 define a slot, generally designated 81, therebetween, the slot 81 having a width that is the same as, of greater than, a thickness of the sprocket plate 18, such that the slot 81 can be used to secure the coil spring assembly 88 within a corresponding one of the coil spring recesses 54 formed in the sprocket plate 18, as shown in FIG. 10. FIG. 10 illustrates the coil spring assemblies 88 attached to the sprocket plate 18 to define a sprocket assembly 90. FIGS. 1A-2D show the sprocket assembly 90 inserted within the housing defined by the upper and lower housing portions 20, 22. When in the assembled state shown in at least FIGS. 1A-2D, coil spring assemblies 88 are contained within the cavity defined by opposing pairs of the coil spring receivers 60 formed in the upper and lower housing portions 20, 22. In some embodiments, the coil spring holder 28 is injection molded plastic, but any suitable material may be used without deviating from the scope of the subject matter disclosed herein.

The coupling 10 advantageously includes a thrust bearing 29, which is shown in at least FIGS. 2C-2E positioned between the thrust bearing surface 67 of the lower housing portion 22, the inner member 12, and at least a radially inner portion of sprocket plate 18, such as at least the sprocket teeth 51 and, in some embodiments, extending further radially outwardly beyond the sprocket teeth 51, but terminating prior to the coil spring holders 60 formed in the upper and lower housing portions 20, 22. The thrust bearing 29 provides for torsional rotation of the coupling 10.

During operation, the coupling 10 has an elastomeric material (e.g., rubber) in the form of the tubeform 16 and the outer and inner coil springs 24, 26 of the coil spring assembly 88, which are initially regarded as being in series (e.g., being activated sequentially as rotary displacement of the components of the coupling 10 progresses). Upon initial rotation of the inner member 12 relative to the outer member 14 and/or the sprocket plate 18, each of the protrusions 48 moves within (e.g., rotate within) a corresponding one of the engagement recesses 50 of the sprocket plate 18, ultimately one or more of (e.g., each of) the protrusions 48 contacting a lateral edge of the engagement recess 50, defined by the sprocket teeth 51, at the completion of the first stage stiffness. After the protrusions 48 have contacted the lateral edges of the engagement recesses 50, the coil spring assemblies 88 are compressively engaged upon further rotary movement of the inner member 12, along with the inner member 14, and the sprocket plate 18, to provide the second stage stiffness. In the example embodiment shown, the protrusions 48 contact the bumps 72 of the lower housing portion 22 to provide surface effect damping during the second stage stiffness, upon the coupling receiving a rotary force of sufficient magnitude to cause a rotation of the inner member 12, the outer member 14, and the sprocket plate 18 by a sufficient angle to align the protrusions 48 with the bumps 72. The placement of the bumps 72 about the ring 69 of the lower housing portion 22 can be selected to provide engagement of the surface effect damping between the protrusions 48 and the bumps 72 at any desired angular position of the inner member 12, the outer member 14, and the sprocket plate 18, relative to the housing formed by the upper and lower housing portions 20, 22. In some embodiments, the bumps 72 may be non-uniformly arranged or positioned about the ring 69, relative to the undeflected positions of the protrusions 48, such that the protrusions 48 do not engage all of the bumps 72 at a same degree of angular displacement, but instead engage the bumps 72 in multiple sequential stages.

In some other embodiments, the bumps 72 may be arranged or positioned such that the protrusions 48 contact the bumps 72 of the lower housing portion 22 to provide surface effect damping and the first stage damping prior to the engagement of the second stage stiffness; in such embodiments, after the protrusions 48 have contacted the lateral edges of the engagement recesses 50 and the bumps 72, the coil spring assemblies 88 are compressively engaged upon further rotary movement of the inner member 12, along with the inner member 14, and the sprocket plate 18, to provide the second stage stiffness.

As shown in FIG. 9, the elastomeric tubeform 16 is attached (e.g., bonded, adhesively or otherwise) between, and spaces apart, the inner member 12 and the outer member 14. In some embodiments, the outer member 14 is swaged into the tubeform 16. In some embodiments in which the tubeform 16 is bonded between one or both of the inner member 12 and the outer member 14, the resulting tubeform assembly 86 has a torsional stiffness within a range of about 50,000 pounds force-inch/degree and about 150,000 pounds force-inch/degree, inclusive. In some other such embodiments in which the tubeform 16 is bonded between one or both of the inner member 12 and the outer member 14, the resulting tubeform assembly 86 has a torsional stiffness of about 90,000 pounds force-inch/degree. In some embodiments, the tubeform 16 is made from a natural elastomer, a synthetic elastomer, or combinations thereof. In some embodiments, the tubeform 16 can have a laminated structure, having a plurality of sequentially arranged or positioned layers of elastomeric material to form the tubeform 16, the layers of which can be the same, different, alternating, or any suitable arrangement. The tubeform 16 is preferably pre-compressed between about 3% and about 10%, with a more preferred pre-compression of about 6.5%. The term pre-compression means that the tubeform 16 has an uncompressed thickness that is greater than a distance between the outer wall 40 of the inner member 12 and the inner surface of the bonding ring 46 of the outer member 14, when the inner member 12 and the outer member 14 are concentrically arranged or positioned, such that the tubeform 16 is compressed to have a thickness in an assembled state that is less than (e.g., thinner than) than the uncompressed thickness of the tubeform 16. The tubeform 16 according to some embodiments can be designed to experience only about a 25% strain at transition torque and only about a 30% strain at peak torque.

In the example embodiment of the coupling 10 shown, the tubeform 16 is bonded between the inner member 12 and the outer member 14. After the tubeform 16 is bonded between the inner and outer members 12, 14, the outer member 14 is swaged into the tubeform 16, thereby forming the tubeform assembly 86. In forming the example embodiment of the coil spring assembly 88 shown in at least FIG. 10, the inner coil spring 26 is inserted concentrically within (e.g., inserted along the longitudinal axis of) the outer coil spring 24 and a coil spring holder 28 is positioned on each of the opposing ends 82*a*, 82*b* of the outer and inner coil springs 24, 26, after the inner coil spring 26 has been inserted within outer coil spring 24. In forming the example embodiment of the sprocket assembly 90 shown in at least FIG. 10, a plurality of the coil spring assemblies 88 are inserted into the coil spring recesses 54 of the sprocket plate 18. In some embodiments, the coil spring assemblies 88 are pre-compressed, prior to insertion, to have a maximum length substantially corresponding to the length L of the coil spring recess 54 in which the coil spring assembly 88 is to be inserted. In some embodiments, the coil spring assemblies 88 are compressed during insertion within one of the coil spring recesses 54.

FIGS. 11A-11D show various stages of assembly of the coupling 10 according to the example embodiment shown herein. In the first step, shown in FIG. 11A, the thrust bearing 29 is installed into lower housing portion 22, generally concentrically about the hole 68 and generally surrounding the ring 69 and the bumps 72 formed therein. The thrust bearing 29 is installed within the lower housing portion 22 in a position in contact with the thrust bearing surface 67. In the second step, shown in FIG. 11B, after installation of the thrust bearing 29, the sprocket assembly 90 is installed on top of thrust bearing 29, generally concentrically about the ring 69 and the bumps 72 of the lower housing portion 22. In the third step, shown in FIG. 11C, the tubeform assembly 86 is coupled to the sprocket assembly 90, such that a portion (e.g., the inner member 12) of the tubeform assembly 86 is rotatable, as least to some degree, relative to the sprocket assembly 90, and specifically to the sprocket plate 18, while another portion (e.g., the outer member 14) of the tubeform assembly 86 is rigidly attached (e.g., so as to prevent relative movements therebetween) to the sprocket assembly, and specifically to the sprocket plate. As shown in the example embodiment disclosed herein, a fastener (e.g., a bolt, rivet, and the like) is used to rigidly couple the outer member 14 of the tubeform assembly 86 to the sprocket plate 18, thereby securing the tubeform assembly 86 on top of the sprocket assembly 90. Any type of fastener suitable for coupling the outer member 14 to the sprocket plate 18 may be used. In the fourth step, shown in FIG. 11D, the upper housing portion 20 is installed over the lower housing portion 22, such that the sprocket assembly 90 and the tubeform assembly 86 are, at least partially, contained within the housing formed by the upper and lower housing portions 20, 22. The upper housing portion 20 is positioned to at least partially surround the tubeform assembly 86, such that at least a portion of the tubeform assembly protrudes from the hole 58 formed in the upper housing portion 20. In some embodiments, the inner member 12 is positioned to protrude from, be coplanar with, or recessed within, the hole 58 formed in the upper housing 20. After being positioned over the sprocket assembly 90 and the tubeform assembly 86, in which position the flanges 66 of the upper and lower housing portions 20, 22 are positioned adjacent to and/or abutting (e.g., in direct or indirect contact with) each other, the upper and lower housing portions 20, 22 are secured to each other (e.g., by fasteners, spot welding, or any suitable attachment technique) at the notches 62A, 62B formed in the flanges 66A, 66B of the upper and lower housing portions 20, 22. In some embodiments, the tubeform assembly 86 is secured to the sprocket by a spot welding technique, either in addition to or in place of the fasteners discussed elsewhere herein to secure the outer member 14 to the sprocket plate 18, or by any other suitable type of attachment. The reference herein to "steps" is not to be interpreted as being an exhaustive list of steps and further sub-steps, or additional steps, may be included during the assembly of the coupling 10 disclosed herein.

Other embodiments of the current invention will be apparent to those skilled in the art from a consideration of this specification or practice of the invention disclosed herein. Thus, the foregoing specification is considered merely exemplary of the current invention with the true scope thereof being defined by the following claims.

What is claimed is:

1. A coupling comprising:
   a housing comprising:
   an upper housing portion having a main body, an opening formed in the main body of the upper housing portion, and a plurality of coil spring receivers positioned circumferentially about and extending away from the main body of the upper housing portion;
   a lower housing portion having a main body, an opening formed in the main body of the lower housing portion, and a plurality of coil spring receivers positioned circumferentially about and extending away from the main body of the lower housing portion;
a sprocket plate comprising:
  an inner opening formed through a thickness of the sprocket plate;
  a plurality of sprocket teeth positioned circumferentially about an inner diameter of the inner opening;
  a plurality of engagement recesses, each engagement recess being defined between adjacent sprocket teeth; and
  a plurality of coil spring recesses positioned circumferentially about, and extending radially inwardly from, a perimeter of the sprocket plate;
a tubeform assembly comprising:
  an inner member comprising:
    a mounting ring at a first longitudinal end of the inner member;
    a lower edge at a second longitudinal end of the inner member;
    a bonding element in a form of an outer wall between the mounting ring and the lower edge;
    a plurality of tangs attached to, and extending away from, the lower edge, the plurality of tangs positioned circumferentially around the lower edge,
  an outer member comprising:
    a bonding ring in a form of an outer wall that is substantially concentrically positioned about the bonding element of the inner member; and
    a flange extending away from the bonding ring, the outer member being rigidly secured to the sprocket plate via the flange; and
  a tubeform comprising an elastomeric material, wherein the tubeform is between the bonding ring of the outer member and the bonding element of the inner member;
  wherein the tubeform assembly is positioned, relative to the sprocket plate, such that each of the plurality of tangs is positioned within a corresponding one of the plurality of engagement recesses; and
a plurality of coil spring assemblies, each comprising:
  an outer coil spring having a first end and a second end; and
  at least two coil spring holders, one of which is positioned at the first end of the outer coil spring and another of which is positioned at the second end of the outer coil spring;
wherein each of the plurality of coil spring assemblies is positioned within a corresponding one of the plurality of coil spring recesses of the sprocket plate, such that the plurality of coil spring assemblies and the sprocket plate form a sprocket assembly;
wherein the tubeform assembly is positioned on a first side of the sprocket assembly and secured to the sprocket plate;
wherein the upper housing portion is positioned on a first side of the sprocket assembly and disposed about the tubeform assembly; and
wherein the lower housing portion is positioned on a second side of the sprocket assembly, opposite the first side of the sprocket assembly.

2. The coupling of claim 1, wherein:
the inner member comprises a circular opening in a center of the inner member; and
the circular opening is adjacent to a ring, which is in a form of a circular wall, of the lower housing portion.

3. The coupling of claim 1, comprising a plurality of fastener holes positioned circumferentially about the sprocket plate and formed through the thickness of the sprocket plate.

4. The coupling of claim 1, comprising a thrust bearing positioned around the circular opening;
  wherein the lower housing portion and the thrust bearing are arranged such that the sprocket assembly is positioned on top of the thrust bearing, with a portion of each of the plurality of coil spring assemblies positioned in one of the coil spring receivers of the lower housing portion.

5. The coupling of claim 1, wherein the tubeform is bonded to the bonding element of the inner member and/or the bonding ring of the outer member.

6. The coupling of claim 1, wherein the tubeform assembly comprises a plurality of protrusions formed about opposing lateral sides and a radially inner side of the plurality of tangs, the plurality of protrusions comprising an elastomeric material.

7. The coupling of claim 6, wherein the outer member is swaged into the tubeform after being bonded to the tubeform at the bonding ring thereof.

8. The coupling of claim 6, wherein the plurality of protrusions are formed integrally with, or separate from, the tubeform.

9. The coupling of claim 6, wherein the plurality of tangs, as well as the plurality of protrusions formed thereon, and the sprocket teeth are circumferentially distributed in an alternating pattern when the tubeform assembly and the sprocket plate are assembled together.

10. The coupling of claim 9, wherein there is a gap between lateral surfaces of the protrusion and adjacent lateral edges of the engagement recesses, such that the inner member is rotatable, relative to the sprocket plate, until the gap is closed and the protrusion contacts the sprocket plate at a first angular position.

11. The coupling of claim 10, wherein the tubeform is configured to react a rotary movement between the inner member and the sprocket plate, through the outer member, in shear to provide a first stage stiffness of the coupling.

12. The coupling of claim 11, wherein, after the protrusions are in contact with the sprocket teeth of the sprocket plate, the inner member and the sprocket plate are configured to rotate in unison at all angular positions beyond the first angular position.

13. The coupling of claim 12, wherein, when the inner member and the sprocket plate undergo a rotary movement beyond the first angular position, the sprocket plate is configured to exert a compressive force on the coil spring assemblies, such that the coil spring assemblies provide a second stage stiffness when compressed by the rotary movement of the of the inner member and the sprocket plate, and wherein the second stage stiffness is greater than the first stage stiffness.

14. The coupling of claim 13, wherein an arrangement pattern of the plurality of coil spring receivers of the lower housing portion mirrors an arrangement pattern of the plurality of coil spring receivers of the upper housing portion, wherein the opening of the lower housing portion comprises a ring having a plurality of bumps extending radially outwards from the opening of the lower housing portion.

15. The coupling of claim 14, wherein a portion of each of the plurality of coil spring assemblies is positioned in one of the coil spring receivers of the upper and lower housing portions, respectively.

16. The coupling of claim 14, wherein the bumps are positioned about the ring defining the opening of the lower housing portion, such that a radially inner surface of the protrusions contacts a corresponding one of the bumps when the inner member and the sprocket plate are rotated to a second angular position, the second angular position being a greater angular displacement than the first angular position.

17. The coupling of claim 16, wherein contact between the protrusions and the bumps provides surface effect damping to the coupling, in addition to the first and second stage stiffnesses.

18. The coupling of claim 1, comprising a plurality of securing points positioned about an outer circumference of respective flanges of the upper and lower housing portions, wherein the upper housing portion and the lower housing portion are secured together at the plurality of securing points.

19. The coupling of claim 1, wherein one or more of the plurality of coil spring assemblies comprises an inner coil spring positioned concentrically within the outer coil spring, such that the inner coil spring is coaxial with the outer coil spring.

20. The coupling of claim 19, wherein:
at least one of the coil spring holders comprises an inner ring configured for insertion within the first end of the inner coil spring; and
the other coil spring holder is configured for insertion within the second end of the inner coil spring.

* * * * *